US008290204B2

(12) United States Patent
Nielsen et al.

(10) Patent No.: US 8,290,204 B2
(45) Date of Patent: *Oct. 16, 2012

(54) SEARCHABLE ELECTRONIC RECORDS OF UNDERGROUND FACILITY LOCATE MARKING OPERATIONS

(75) Inventors: Steven E. Nielsen, North Palm Beach, FL (US); Curtis Chambers, Palm Beach Gardens, FL (US); Jeffrey Farr, Jupiter, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 919 days.

This patent is subject to a terminal disclaimer.

(21) Appl. No.: 12/369,232

(22) Filed: Feb. 11, 2009

(65) Prior Publication Data

US 2009/0202112 A1 Aug. 13, 2009

Related U.S. Application Data

(63) Continuation-in-part of application No. 12/029,732, filed on Feb. 12, 2008, and a continuation-in-part of application No. 12/366,853, filed on Feb. 6, 2009, which is a continuation-in-part of application No. 12/050,555, filed on Mar. 18, 2008.

(51) Int. Cl.
*G06K 9/00* (2006.01)
(52) U.S. Cl. .............................. 382/100; 702/6; 348/85
(58) Field of Classification Search .................. 382/100, 382/103, 109, 113; 348/84, 85, 135, 143
See application file for complete search history.

(56) References Cited

U.S. PATENT DOCUMENTS

| 4,623,282 A | 11/1986 | Allen |
| 5,414,462 A | 5/1995 | Veatch |
| 5,576,973 A | 11/1996 | Haddy |
| 5,644,237 A | 7/1997 | Eslambolchi et al. |
| 5,699,244 A | 12/1997 | Clark, Jr. |

(Continued)

FOREIGN PATENT DOCUMENTS

CA 2386200 4/2001

(Continued)

OTHER PUBLICATIONS

Co-pending U.S. Appl. No. 12/607,843, filed Oct. 28, 2009.

(Continued)

*Primary Examiner* — Anand Bhatnagar
(74) *Attorney, Agent, or Firm* — Foley & Lardner LLP; Joseph Teja, Jr.

(57) ABSTRACT

Methods and apparatus for generating a searchable electronic record of a locate operation in which a presence or an absence of at least one underground facility within a dig area may be identified using one or more physical locate marks. Source data representing one or more input images of a geographic area comprising the dig area is received and processed so as to display at least a portion of the input image(s) on a display device. One or more digital representations of the physical locate mark(s) applied to the dig area during the locate operation are added to the displayed input image(s) as "locate mark indicators" so as to generate a marked-up image. Information relating to the marked-up image is electronically transmitted and/or electronically stored so as to generate the searchable electronic record of the locate operation.

42 Claims, 16 Drawing Sheets

U.S. PATENT DOCUMENTS

| | | | |
|---|---|---|---|
| 5,815,411 A | 9/1998 | Ellenby | |
| 5,920,194 A | 7/1999 | Lewis et al. | |
| 5,987,380 A | 11/1999 | Backman | |
| 6,101,087 A | 8/2000 | Sutton | |
| 6,127,827 A | 10/2000 | Lewis | |
| 6,201,883 B1 | 3/2001 | Mizui | |
| 6,299,934 B1 | 10/2001 | Manning | |
| 6,351,707 B1 | 2/2002 | Ichikawa | |
| 6,426,872 B1 | 7/2002 | Sutton | |
| 6,430,499 B1 | 8/2002 | Nakano | |
| 6,437,708 B1 | 8/2002 | Brouwer | |
| 6,477,475 B1 | 11/2002 | Takaoka et al. | |
| 6,493,650 B1 | 12/2002 | Rodgers | |
| 6,650,293 B1 * | 11/2003 | Eslambolchi et al. | 342/459 |
| 6,710,741 B2 * | 3/2004 | Tucker | 342/357.25 |
| 6,723,375 B2 | 4/2004 | Zeck et al. | |
| 6,751,552 B1 | 6/2004 | Minelli | |
| 6,751,553 B2 * | 6/2004 | Young et al. | 702/5 |
| 6,772,142 B1 | 8/2004 | Kelling et al. | |
| 6,778,128 B2 | 8/2004 | Tucker et al. | |
| 6,853,905 B2 | 2/2005 | Barton | |
| 6,873,998 B1 | 3/2005 | Dorum | |
| 6,895,356 B2 | 5/2005 | Brimhall | |
| 6,898,525 B1 | 5/2005 | Minelli | |
| 6,904,361 B1 | 6/2005 | Tallman et al. | |
| 6,950,535 B2 | 9/2005 | Sibayama | |
| 6,956,524 B2 | 10/2005 | Tucker et al. | |
| 6,958,690 B1 | 10/2005 | Asher et al. | |
| 6,972,698 B2 | 12/2005 | Deguchi | |
| 6,999,021 B2 | 2/2006 | Taylor, Jr. | |
| 7,003,138 B2 | 2/2006 | Wilson | |
| 7,009,399 B2 | 3/2006 | Olsson et al. | |
| 7,027,653 B2 | 4/2006 | Hino | |
| 7,120,564 B2 | 10/2006 | Pacey | |
| 7,142,196 B1 | 11/2006 | Connor | |
| 7,185,021 B2 | 2/2007 | Kishigami | |
| 7,216,034 B2 | 5/2007 | Vitikainen | |
| 7,372,247 B1 | 5/2008 | Giusti et al. | |
| 7,400,976 B2 | 7/2008 | Young et al. | |
| 7,417,641 B1 | 8/2008 | Barber | |
| 7,437,830 B1 | 10/2008 | Kulavic | |
| 7,469,247 B2 | 12/2008 | Cossins et al. | |
| 7,584,123 B1 | 9/2009 | Karonis et al. | |
| 7,613,331 B2 | 11/2009 | Maeda | |
| 7,626,496 B1 | 12/2009 | Asher et al. | |
| 7,636,901 B2 | 12/2009 | Munson | |
| 7,640,105 B2 | 12/2009 | Nielsen et al. | |
| 7,773,095 B1 | 8/2010 | Badrak et al. | |
| 7,777,648 B2 | 8/2010 | Smith et al. | |
| 7,889,888 B2 | 2/2011 | Deardorr | |
| 7,978,129 B2 * | 7/2011 | Sawyer et al. | 342/357.48 |
| 2001/0036295 A1 | 11/2001 | Hendrickson | |
| 2002/0013704 A1 | 1/2002 | Finney | |
| 2002/0052755 A1 | 5/2002 | Whatley | |
| 2002/0184235 A1 | 12/2002 | Young | |
| 2003/0012411 A1 * | 1/2003 | Sjostrom et al. | 382/109 |
| 2004/0006425 A1 | 1/2004 | Wood | |
| 2004/0073578 A1 | 4/2004 | Nam | |
| 2004/0146185 A1 | 7/2004 | Blair | |
| 2004/0151388 A1 | 8/2004 | Maeda | |
| 2004/0203909 A1 | 10/2004 | Koster | |
| 2004/0210370 A1 | 10/2004 | Gudat | |
| 2004/0210386 A1 | 10/2004 | Wood | |
| 2005/0033513 A1 | 2/2005 | Gasbarro | |
| 2005/0034074 A1 | 2/2005 | Munson | |
| 2005/0046584 A1 | 3/2005 | Breed | |
| 2005/0057745 A1 | 3/2005 | Bontje | |
| 2005/0125389 A1 | 6/2005 | Hazzard et al. | |
| 2005/0192752 A1 | 9/2005 | Rooney | |
| 2005/0203768 A1 | 9/2005 | Florance | |
| 2005/0219268 A1 | 10/2005 | Kyle | |
| 2006/0020417 A1 | 1/2006 | Koch et al. | |
| 2006/0058945 A1 | 3/2006 | Watanabe | |
| 2006/0077095 A1 | 4/2006 | Tucker et al. | |
| 2006/0085396 A1 * | 4/2006 | Evans et al. | 707/3 |
| 2006/0161349 A1 | 7/2006 | Cross | |
| 2006/0229809 A1 | 10/2006 | Chen | |
| 2006/0282280 A1 | 12/2006 | Stotz et al. | |
| 2007/0027591 A1 | 2/2007 | Goldenberg | |
| 2007/0076920 A1 | 4/2007 | Ofek | |
| 2007/0100768 A1 | 5/2007 | Boccon-Gibod et al. | |
| 2007/0143676 A1 | 6/2007 | Chen | |
| 2007/0182721 A1 | 8/2007 | Watanabe et al. | |
| 2007/0219722 A1 | 9/2007 | Sawyer, Jr. | |
| 2008/0021863 A1 | 1/2008 | Evans | |
| 2008/0059889 A1 | 3/2008 | Parker et al. | |
| 2008/0109751 A1 | 5/2008 | Fitzmaurice et al. | |
| 2008/0125942 A1 | 5/2008 | Tucker et al. | |
| 2008/0245299 A1 | 10/2008 | Nielsen et al. | |
| 2009/0013806 A1 | 1/2009 | Miller et al. | |
| 2009/0013928 A1 | 1/2009 | Nielsen et al. | |
| 2009/0070071 A1 | 3/2009 | Wood | |
| 2009/0100185 A1 | 4/2009 | Sheha et al. | |
| 2009/0121937 A1 | 5/2009 | Kaegebein | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0241046 A1 | 9/2009 | Nielsen et al. | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0084532 A1 | 4/2010 | Nielsen et al. | |
| 2010/0085054 A1 | 4/2010 | Nielsen et al. | |
| 2010/0085185 A1 | 4/2010 | Nielsen et al. | |
| 2010/0085376 A1 | 4/2010 | Nielsen et al. | |
| 2010/0085694 A1 | 4/2010 | Nielsen et al. | |
| 2010/0085701 A1 | 4/2010 | Nielsen et al. | |
| 2010/0086671 A1 | 4/2010 | Nielsen et al. | |
| 2010/0086677 A1 | 4/2010 | Nielsen et al. | |
| 2010/0088031 A1 | 4/2010 | Nielsen et al. | |
| 2010/0088032 A1 | 4/2010 | Nielsen et al. | |
| 2010/0088134 A1 | 4/2010 | Nielsen et al. | |
| 2010/0088135 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0094553 A1 | 4/2010 | Nielsen et al. | |
| 2010/0117654 A1 | 5/2010 | Nielsen et al. | |
| 2010/0188088 A1 | 7/2010 | Nielsen et al. | |
| 2010/0188215 A1 | 7/2010 | Nielsen et al. | |
| 2010/0188216 A1 | 7/2010 | Nielsen et al. | |
| 2010/0188245 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0201706 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0205195 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205554 A1 | 8/2010 | Nielsen et al. | |

| | | |
|---|---|---|
| 2010/0205555 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0241936 A1 | 10/2011 | Sawyer, Jr. et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |

FOREIGN PATENT DOCUMENTS

| | | |
|---|---|---|
| CA | 2528795 | 6/2007 |
| WO | WO-02/067083 | 8/2002 |

OTHER PUBLICATIONS

International Search Report and Written Opinion, Application Serial No. PCT/US2009/000859, Apr. 14, 2009.
Common Ground Alliance, Best Practices Version 1.0, Apr. 2003.
Common Ground, Study of One-Call Systems and Damage Prevention Best Practices, Aug. 1999.
Co-Pending U.S. Appl. No. 12/029,732, filed Feb. 12, 2008.
Co-Pending U.S. Appl. No. 12/208,846, filed Sep. 11, 2008.
Co-Pending U.S. Appl. No. 12/363,009, filed Jan. 30, 2009.
Co-Pending U.S. Appl. No. 12/363,046, filed Jan. 30, 2009.
Co-Pending U.S. Appl. No. 12/366,050, filed Feb. 5, 2009.
Co-Pending U.S. Appl. No. 12/369,565, filed Feb. 11, 2009.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009.
Virginia Pilot Project, Incorporating GPS Technology to Enhance One-Call Damage Prevention, Phase I—Electronic White Lining Project Report, Nov. 2007, 50 pages.
Notice of Allowance dated Apr. 30, 2012 from U.S. Appl. No. 12/208,846.
Notice of Allowance dated Dec. 13, 2011 from U.S. Appl. No. 12/369,565.
Office Action dated Jan. 20, 2012 from U.S. Appl. No. 13/190,138.
Office Action dated Feb. 29, 2012 from U.S. Appl. No. 12/833,177.
Office Action dated Mar. 2, 2012 from U.S. Appl. No. 12/831,330.
Office Action dated Mar. 8, 2012 from U.S. Appl. No. 13/190,185.
Office Action dated Mar. 19, 2012 from U.S. Appl. No. 12/208,846.
Office Action dated Apr. 17, 2012 from U.S. Appl. No. 12/607,843.
Office Action dated Apr. 23, 2012 from U.S. Appl. No. 12/366,050.
Office Action dated Apr. 25, 2012 from U.S. Appl. No. 12/363,046.
Office Action dated May 1, 2012 from U.S. Appl. No. 12/363,009.
Office Action dated May 7, 2012 U.S. Appl. No. 13/193,337.
Heath, M. et al., "Comparison of Edge Defectors: A Methodology and Intial Study," 1996, IEEE Computer Society Press; http://citeseerx.ist.psu.edu/viewdoc/summary?doi=10.1.45.5214.
Office Action dated Apr. 5, 2012 from U.S. Appl. No. 13/191,048.
Office Action dated Apr. 6, 2012 from U.S. Appl. No. 13/191,058.
Office Action dated Apr. 11, 2012 from U.S. Appl. No. 12/029,732.
Office Action dated May 24, 2012 from U.S. Appl. No. 13/190,138.
Office Action dated May 24, 2012 from U.S. Appl. No. 13/194,121.
Office Action dated Jun. 8, 2012 from U.S. Appl. No. 13/194,163.
Office Action dated Jun. 28, 2012 from U.S. Appl. No. 12/369,565.
Ross, C., "2d Tile Map Editor," Oct. 19, 2005, http://www.blitzbasic.com/Community/posts.php?topic=52152, pp. 1-3.
w3schools: "JavaScript Pop Up Boxes," Aug. 11, 2005; http://www.w3schools.com/js/js_popup.asp, pp. 1-2.
Binder 1: "Virginia Utility Protection Service, Inc. Response to US Patent Application Publication . . . ," pp. DY0001-755, Nov. 3, 2010.
Binder 2: "Patent US 2009 0237408," pp. DY0756-1271, Nov. 3, 2010.
Binder 3: "Patent US 2009 0238414," pp. DY1272-2210, Nov. 3, 2010.
Binder 4: "Patent US 2009 0238415," pp. DY2211-3308, Nov. 3, 2010.
Binder 5: "Patent US 2009 0238416," pp. DY3009-3889, Nov. 3, 2010.
Binder 6: "Patent US 2009 0238417," pp. DY3890-4133, Nov. 3, 2010.
Binder 7: "Patent US 2009 0241045," pp. DY4134-4276, Nov. 3, 2010.
Binder 8: "Patent US 2009 0241046," pp. DY4277-4499, Nov. 3, 2010.
R. Pevarski, Letter from the Virginia Utility Protection Service, Inc., dated Apr. 7, 2010.
H.L. Smith, Letter dated Oct. 27, 2010.
H.L. Smith, Letter dated Jan. 14, 2011, with two attachments each dated Jan. 5, 2011.
Office Action dated Nov. 23, 2011 from U.S. Appl. No. 12/208,846.
Office Action dated Nov. 23, 2011 from U.S. Appl. No. 12/363,009.
Office Action dated Nov. 26, 2010 from Australian Application No. 2009213151.
Office Action dated Nov. 29, 2011 from Australian Application No. 2009213151.
Notice of Allowance dated Jul. 23, 2012 from U.S. Appl. No. 12/369,565.
Notice of Allowance dated Jul. 11, 2012 from U.S. Appl. No. 12/366,050.
Office Action dated Jul. 26, 2012 from Canadian Application No. 2,707,246.

Supplemental Notice of Allowance dated Jul. 27, 2012 from U.S. Appl. No. 12/366,050.
U.S. Appl. No. 12/831,330, filed Jul. 7, 2010, Nielsen et al.
U.S. Appl. No. 13/190,138, filed Jul. 25, 2011, Nielsen et al.
U.S. Appl. No. 13/190,185, filed Jul. 25, 2011, Nielsen et al.
U.S. Appl. No. 13/191,048, filed Jul. 26, 2011, Nielsen et al.
U.S. Appl. No. 13/191,058, filed Jul. 26, 2011, Nielsen et al.
U.S. Appl. No. 13/194,121, filed Jul. 29, 2011, Nielsen et al.
U.S. Appl. No. 13/194,163, filed Jul. 29, 2011, Nielsen et al.
U.S. Appl. No. 13/193,337, filed Jul. 28, 2011, Nielsen et al.
U.S. Appl. No. 13/185,194, filed Jul. 18, 2011, Nielsen et al.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
GPS Technology Enhancing Underground Utility Locating, Underground Construction Magazine, Apr. 7, 2010, 4 pages, http://www.undergroundconstructionmagazine.com/print/1034?page=show.
InMaps Develps Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report, Application No. PCT/US10/041160, Oct. 6, 2010.
Letter from Norfield Data Products to Wolf Greenfield & Sacks, P.C., May 5, 2010, 2 pages.
Notice of Allowance dated Oct. 6, 2011 from CA Applicaton No. 2,715,312.
Office Action dated Jun. 23, 2011 from U.S. Appl. No. 12/208,846.
Office Action dated Jul. 13, 2011 from U.S. Appl. No. 12/029,732.
Office Action dated Oct. 4, 2011 from Canadian Application No. 2,707,246.
Office Action Dated Oct. 6, 2011 from U.S. Appl. No. 12/366,050.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Stahovich, David M. et al., "Automated and Integrated Call Before You Dig," Proceedings of GITA 2005, GITA'18th Annaul Conference, Mar. 6-9, 2005, Denver, CO, online: GIS for Oil & Gas Conference 2002 <http://www.gisdevelopment.net/proceedings/gita/2005/papers/76.pdf>.
UGI Utilities Selects KEMA for FLAME Project Implementation, Burlington, Massachusetts, Electric Energy Publications, Inc., Feb. 10, 2004, http://www.eet-d.com/?page=show_news&id=17641, 2 pages.
UGI Utilities, Inc., FLAME Project White Paper, (original publication date unknown), received Aug. 3, 2011, 12 pages.

* cited by examiner

SEARCHABLE ELECTRONIC RECORDS OF UNDERGROUND FACILITY LOCATE MARKING OPERATIONS

CROSS-REFERENCE TO RELATED APPLICATIONS

This application claims the benefit under 35 U.S.C. §120 as a continuation-in-part of U.S. patent application Ser. No. 12/029,732, filed Feb. 12, 2008, entitled "Electronic Manifest of Underground Facility Locate Marks."

This application also claims the benefit under 35 U.S.C. §120 as a continuation-in-part of U.S. patent application Ser. No. 12/366,853, filed Feb. 6, 2009, entitled "Virtual White Lines for Indicating Planned Excavation Sites on Electronic Images," which in turn claims the benefit under 35 U.S.C. §120 as a continuation-in-part of U.S. patent application Ser. No. 12/050,555, filed Mar. 18, 2008, entitled "Virtual White Lines for Delimiting Planned Excavation Sites."

The disclosures of each of U.S. patent application Ser. Nos. 12/029,732, 12/366,853 and 12/050,555 are incorporated herein by reference in their entirety for all purposes.

BACKGROUND

Excavators are required to notify underground facility owners/operators in advance of their excavation activities and to describe and communicate the geographic area of those activities to underground facility owners/operators. The geographic area so described is commonly referred to as "the dig area." In turn, facility owners/operators are required to determine if they own or operate any underground facilities at an identified dig area. The presence of underground facilities at a dig area is generally detected using a device commonly referred to as a "locate wand." Locate wands use a number of electronic methods to detect the presence of underground facilities. The location of those underground facilities, if any, which exist within a dig area, is marked using paint or some other physical marking system, such as flags. Paint is generally applied as a sequence of dashes or dots on the surface (grass, dirt, asphalt, concrete, etc.) directly above the underground facility and is color-coded to indicate to the excavator the type (e.g., gas, water, sewer, power, telephone, cable television, etc.) of the underground facility present. Flags, which also may identify the underground facility via color-coding, can be placed in the ground directly above the underground facility being marked. Paint and/or flags can be dispensed using various devices. The application of paint, flags, or some other marking object to indicate the presence of an underground facility is called a "locate." The marks resulting from a locate are commonly called underground facility "locate marks."

Underground facility owners/operators may perform locates with in-house employees or choose to hire independent contract locating firms to perform locates on their behalf. Generally, the person performing the locate operation is called a locate technician. The set of instructions necessary for a locate technician to perform a locate operation may be called a "ticket." A ticket might specify, for example, the address or description of the dig area to be marked, the day and/or time that the dig area is to be marked, and/or whether the user is to mark the dig area for telecommunications (e.g., telephone and/or cable television), power, gas, water, sewer, or some other underground facility.

It is generally recommended, or in some jurisdictions required, to document the type and number of underground facilities located, i.e. telephone, power, gas, water, sewer, etc., and the approximate geographic location of the locate marks. Often times it is also recommended or required to document the distance, or "offset" of the locate marks from environmental landmarks that exist at the dig area. An environmental landmark may include any physical object that is likely to remain in a fixed location for an extended period of time. Examples of an environmental landmark may include a tree, a curb, a driveway, a utility pole, a fire hydrant, a storm drain, a pedestal, a water meter box, a manhole lid, a building structure (e.g., a residential or office building), or a light post. For example, a telephone cable located two and a half meters behind the curb of a residential street would be documented as being offset two and a half meters behind the curb. These offsets serve as evidence supporting the location of the locate marks after those locate marks may have been disturbed by the excavation process.

Documentation of some or all of the information regarding a locate operation is often called a "manifest." A manifest may typically contain a variety of information related to a locate operation including a sketch or drawing of the dig area that identifies the approximate location of the locate marks and environmental landmarks present at the dig area; the time and date the locate operation was performed; identification of the entity and the locate technician performing the locate operation; the entity requesting the locate operation; the geographic address of the dig area; the type of markings used for the locate operation (e.g., colored paint, flags, or other markers); notes from the locate technician; and/or a technician signature.

If performing locate operations with in-house employees, each individual underground facility owner/operator generally documents on the manifest only the existence of its facilities and the approximate location of its locate marks. If an independent contract locating firm is hired to perform locates for more than one underground facility owner/operator, the contract locating firm may document on the manifest some or all of the underground facilities at the dig area that it located and the approximate location of all the locate marks.

Currently, locate marks are generally documented using a sketching process which results in the creation of a paper manifest. Sketches are produced by hand, are not to scale, prone to human error, and costly in drafting time spent by the locate technician. They are stored manually or in some jurisdictions are digitally scanned/photographed and the image stored electronically. Because the manifests are stored as paper or digital images, they are not easily interrogated for data in any mechanized way.

SUMMARY

Various embodiments of the present invention are directed to methods, apparatus and systems for creating a searchable electronic record, or "electronic manifest," relating to a geographic area including a dig area to be excavated or otherwise disturbed. As part of the electronic record, the geographic location of one or more physical locate marks, applied to the dig area during a locate operation to indicate a presence (or absence) of one or more located underground facilities, is somehow identified with respect to its immediate surroundings in the geographic area.

To create such an electronic record, in one exemplary implementation one or more input images relating to the geographic area including the dig area may be utilized. For example, source data representing one or more input images of a geographic area including the dig area is received and/or processed so that the input image(s) may be displayed on a display device. The geographic location of the physical locate mark(s) is then indicated in some manner on the displayed input image(s) so as to generate one or more marked-up images constituting at least a portion of the electronic record. For example, geographic locations of the physical locate mark(s) may be indicated in the marked-up image(s) using digital representation(s) of the physical locate mark(s) ("locate mark indicators") that are added to the marked-up image (s). In other implementations, the input image need not necessarily be displayed to add one or more locate mark indicators; for example, geographic information relating to one or more physical locate marks applied to the dig area may be received and locate mark indicator(s) may be added to the input image based on the geographic information, without requiring display of the input image.

In some implementations of the inventive concepts disclosed herein, the searchable electronic record may include a variety of non-image information to facilitate identification of the geographic location of the physical locate mark(s) (e.g., a text description of the geographic location of the physical locate mark(s), an address or lot number of a property within which the physical locate mark(s) are located, geo-encoded information such as geographic coordinates relating to the physical locate mark(s) and/or various aspects of the geographic area surrounding the physical locate mark(s), as well as other non-image information relating generally to the locate operation (e.g., a timestamp for the locate operation, geographic information relating to the dig area, one or more identifiers for a locate technician and/or a locate company performing the locate operation, information regarding one or more environmental landmarks, etc.). The marked-up image (s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

In sum, one embodiment of the present invention is directed to a method performed by a device. The method comprises receiving information regarding a particular geographic area; retrieving an aerial image of the particular geographic area; displaying the aerial image; determining an approximate geographic location of a locate mark denoting an underground facility; overlaying, on the displayed aerial image, information concerning the approximate geographic location of the locate mark denoting the underground facility; and storing the aerial image and the information concerning the approximate geographic location of the locate mark denoting the underground facility.

Another embodiment of the present invention is directed to a device, comprising a memory to store aerial images of a plurality of geographic areas; and a processing unit to receive information regarding a particular one of the geographic areas, retrieve one of the aerial images from the memory based on the received information, receive information concerning an approximate geographic location of an underground facility locate mark located within the particular geographic area, present, on the retrieved aerial image, the information concerning the approximate geographic location of the underground facility locate mark, and store the retrieved aerial image and the information concerning the approximate geographic location of the underground facility locate mark.

A further embodiment of the present invention is directed to a system, comprising means for identifying a geographic area; means for retrieving an aerial image of the geographic area; means for displaying the retrieved image; means for receiving input from a user concerning an approximate geographic location of underground facility locate marks that are located within the geographic area; means for presenting, on the displayed aerial image, a marking that identifies the approximate geographic location of the underground facility locate marks within the geographic area; and means for storing the displayed aerial image with the marking that identifies the approximate geographic location of the underground facility locate marks.

Another embodiment of the present invention is directed to a system, comprising a central server to store a plurality of aerial images of a corresponding plurality of geographical locations; and a user device to identify a particular geographic location, determine whether the user device stores an aerial image corresponding to the particular geographic location, retrieve the aerial image from the central server when the user device does not store the aerial image corresponding to the particular geographic location, retrieve the aerial image from a local memory when the user device stores the aerial image corresponding to the particular geographic location, display the aerial image, receive information regarding an approximate location of underground facility locate marks located at the particular geographic location, and present, on the displayed aerial image, a marking that identifies the approximate location of the underground facility locate marks.

A further embodiment of the present invention is directed to a method performed by a device. The method comprises receiving information regarding a particular geographic area; retrieving an aerial image of the particular geographic area; receiving, from a global positioning system (GPS)-enabled device, information regarding an approximate location of underground facility locate marks; displaying, as a combined image, the aerial image and the information regarding the approximate location of underground facility locate marks; and storing the combined image.

Another embodiment of the present invention is directed to a device, comprising a memory to store images of a plurality of geographic locations; a processing unit to retrieve one of the images from the memory based on received information, the received information concerning a geographic location of an underground facility locate mark located within a particular dig area; present, on the retrieved image, the received information of the underground facility locate mark; and store the retrieved image and the received information of the geographic location of the underground facility locate mark.

A further embodiment of the present invention is directed to a system, comprising means for identifying a geographic location; means for retrieving an image of the geographic location; means for displaying the retrieved image; means for receiving input from a user concerning a geographic location of underground facility locate marks that are located within the dig area; means for presenting, on the displayed image, a marking that identifies the geographic location of the underground facility locate marks within the dig area; and means for storing the displayed image with the marking that identifies the geographic location of the underground facility locate marks.

Another embodiment of the present invention is directed to a system, comprising a central server to store a plurality of images of a plurality of geographical locations; a user device to identify at least one of the geographic locations, and to retrieve the image from the central server when the user device does not store the image corresponding to at least one of the geographic locations, or to retrieve the image from a local memory when the user device stores the image corresponding to the at least one of the geographic locations; display the image; receive information regarding an approximate location of underground facility locate marks located at the at least one geographic location; and present, on the displayed image, a marking that identifies the approximate location of the underground facility locate marks.

A further embodiment of the present invention is directed to a method for generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving a digital image of a geographic area comprising the dig area, at least a portion of the received digital image being displayed on a display device; B) adding to the displayed digital image at least one digital representation of the at least one physical locate mark applied by the locate technician during the locate operation so as to generate a marked-up digital image including the at least one digital representation of the at least one physical locate mark; and C) electronically transmitting and/or electronically storing information relating to the marked-up digital image so as to generate the searchable electronic record of the locate operation.

Another embodiment of the present invention is directed to a computer-readable medium encoded with instructions that, when executed on at least one processing unit, perform a method of generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities, the method comprising A) electronically receiving a digital image of a geographic area comprising the dig area; B) receiving user input regarding a geographic location of the at least one physical locate mark applied by the locate technician during the locate operation; and C) rendering a screen display comprising at least a portion of the received digital image and at least one digital representation of the at least one physical locate mark, wherein the at least one digital representation is positioned with respect to the at least a portion of the received digital image based at least in part on the user input received in B).

A further embodiment of the present invention is directed to an apparatus for facilitating generation of a searchable electronic record of a locate operation performed by a locate technician. The locate operation comprising identifying, using at least one physical locate mark, a presence or an absence of at least one underground facility within a dig area. At least a portion of the dig area may be excavated or disturbed during excavation activities. The apparatus comprises a communication interface; a display device; a user input device; a memory to store processor-executable instructions; and a processing unit coupled to the communication interface, the display device, the user input device, and the memory, wherein upon execution of the processor-executable instructions by the processing unit. The processing unit controls the communication interface to electronically receive a digital image of a geographic area including the dig area; controls the display device to display at least a portion of the received digital image; acquires user input from the user input device, the user input relating to a geographic location of the at least one physical locate mark applied by the locate technician during the locate operation; generates a marked-up digital image including at least one digital representation of the at least one physical locate mark based at least in part on the user input; and further controls the communication interface and/or the memory to electronically transmit and/or electronically store information relating to the marked-up digital image so as to generate the searchable electronic record of the locate operation.

Another embodiment of the present invention is directed to a method for generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving a digital image of a geographic area comprising the dig area, at least a portion of the received digital image being displayed on a display device; B) electronically receiving location information regarding an identified location of the at least one physical locate mark; C) based at least in part on the location information received in B), digitally representing, on the displayed digital image, the identified location of the at least one physical locate mark applied by the locate technician during the locate operation so as to generate a marked-up digital image including the at least one digital representation of the at least one physical locate mark; and D) electronically transmitting and/or electronically storing information relating to the marked-up digital image so as to generate the searchable electronic record of the locate operation.

A further embodiment of the present invention is directed to a computer-readable medium encoded with instructions that, when executed on at least one processing unit, perform a method of generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving a digital image of a geographic area comprising the dig area; B) electronically receiving, from a GPS-enabled device, information regarding a GPS-determined geographic location of the at least one physical locate mark applied by the locate technician during the locate operation; C) rendering a screen display comprising at least a portion of the received digital image and at least one digital representation of the at least one physical locate mark, wherein the at least one digital representation is positioned with respect to the at least a portion of the received digital image based on the GPS-determined geographic location of the at least one physical locate mark; and D) electronically transmitting and/or electronically storing information identifying the GPS-determined geographic location of the at least one physical locate mark so as to document the at least one physical locate mark applied by the locate technician.

Another embodiment of the present invention is directed to an apparatus for facilitating generation of a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The apparatus comprises a communication interface; a display device; a memory to store processor-executable instructions; and a processing unit coupled to the communication interface, the display device, and the memory, wherein upon execution of the processor-executable instructions by the processing unit. The processing unit controls the communication interface to electronically receive a digital image of a geographic area including the dig area; controls the display device to display at least a portion of the received digital image; acquires input from a marking device configured to apply the at least one physical locate mark to the dig area, the input relating to a geographic location of the at least one physical locate mark applied by the locate technician during the locate operation; generates a marked-up digital image including at least one digital representation of the at least one physical locate mark, based at least in part on the input acquired from the marking device; and further controls the communication interface and/or the memory to electronically transmit and/or electronically store information relating to the marked-up digital image so as to generate the searchable electronic record of the locate operation.

A further embodiment of the present invention is directed to an apparatus for facilitating generation of a searchable electronic record of a locate operation performed by a locate technician. The locate operation comprises identifying a presence or an absence of at least one underground facility within a dig area. At least a portion of the dig area may be excavated or disturbed during excavation activities. The apparatus comprises a communication interface; a display device; a memory to store processor-executable instructions; and a processing unit coupled to the communication interface, the display device, and the memory. Upon execution of the processor-executable instructions by the processing unit, the processing unit controls the communication interface to electronically receive an image of a geographic area including the dig area; controls the display device to display at least a portion of the received image; combines the electronically received image with image-related information so as to generate the searchable electronic record, and controls the communication interface and/or the memory to electronically transmit and/or electronically store the searchable electronic record of the locate operation so that performance of the location operation is verifiable. The image-related information comprises a geographic location associated with the dig area; and a timestamp indicative of when the locate operation occurred.

Another embodiment of the present invention is directed to a method for generating a searchable electronic record of a locate operation performed by a locate technician. The locate operation comprises identifying a presence or an absence of at least one underground facility within a dig area. At least a portion of the dig area may be excavated or disturbed during excavation activities. The method comprises A) electronically receiving an image of a geographic area comprising the dig area; B) combining the electronically received image with image-related information so as to generate the searchable electronic record; and C) electronically transmitting and/or electronically storing the searchable electronic record of the locate operation so that performance of the location operation is verifiable. The image-related information comprises a geographic location associated with the dig area; and a timestamp indicative of when the locate operation occurred.

A further embodiment of the present invention is directed to a computer-readable medium encoded with instructions that, when executed on at least one processing unit, perform a method of generating a searchable electronic record of a locate operation performed by a locate technician. The locate operation comprises identifying a presence or an absence of at least one underground facility within a dig area, wherein at least a portion of the dig area may be excavated or disturbed during excavation activities. The method comprises A) electronically receiving an image of a geographic area comprising the dig area; B) combining the electronically received image with image-related information so as to generate the searchable electronic record; and C) electronically transmitting and/or electronically storing the searchable electronic record of the locate operation so that performance of the location operation is verifiable. The image-related information comprises a geographic location associated with the dig area; and a timestamp indicative of when the locate operation occurred.

Another embodiment of the present invention is directed to a method for generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving source data representing at least one input image of a geographic area comprising the dig area; B) processing the source data so as to display at least a portion of the at least one input image on a display device; C) adding to the displayed at least one input image at least one digital representation of the at least one physical locate mark applied by the locate technician during the locate operation so as to generate a marked-up image including the at least one digital representation of the at least one physical locate mark; and D) electronically transmitting and/or electronically storing information relating to the marked-up image so as to generate the searchable electronic record of the locate operation.

A further embodiment of the present invention is directed to at least one computer-readable medium encoded with instructions that, when executed on at least one processing unit, perform a method for generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving source data representing at least one input image of a geographic area comprising the dig area; B) processing the source data so as to display at least a portion of the at least one input image on a display device; C) adding to the displayed at least one input image at least one digital representation of the at least one physical locate mark applied by the locate technician during the locate operation so as to generate a marked-up image including the at least one digital representation of the at least one physical locate mark; and D) electronically transmitting and/or electronically storing information relating to the marked-up image so as to generate the searchable electronic record of the locate operation.

Another embodiment of the present invention is directed to an apparatus for facilitating generation of a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The apparatus comprises a communication interface; a display device; a memory to store processor-executable instructions; and a processing unit coupled to the communication interface, the display device, and the memory, wherein upon execution of the processor-executable instructions by the processing unit. The processing unit controls the communication interface to electronically receive source data representing at least one input image of a geographic area including the dig area; processes the source data and controls the display device so as to display at least a portion of the at least one input image; adds to the displayed at least one input image at least one digital representation of the at least one physical locate mark applied by the locate technician during the locate operation so as to generate a marked-up image including the at least one digital representation of the at least one physical locate mark; and further controls the communication interface and/or the memory to electronically transmit and/or electronically store information relating to the marked-up image so as to generate the searchable electronic record of the locate operation.

A further embodiment of the present invention is directed to a method for generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving source data representing at least one input image of a geographic area comprising the dig area, the at least one input image including at least one dig area indicator to provide at least one indication of the dig area in the displayed at least one input image; B) processing the source data so as to display at least a portion of the at least one input image including the at least one dig area indicator on a display device; C) adding to the displayed at least one input image at least one locate mark indicator to provide a digital representation of the at least one physical locate mark applied by the locate technician during the locate operation, thereby generating a marked-up image including the at least one dig area indicator and the at least one locate mark indicator; and D) electronically transmitting and/or electronically storing information relating to the marked-up image so as to generate the searchable electronic record of the locate operation.

Another embodiment of the present invention is directed at least one computer-readable medium encoded with instructions that, when executed on at least one processing unit, perform a method of generating a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The method comprises A) electronically receiving source data representing at least one input image of a geographic area comprising the dig area, the at least one input image including at least one dig area indicator to provide at least one indication of the dig area in the displayed at least one input image; B) processing the source data so as to display at least a portion of the at least one input image including the at least one dig area indicator on a display device; C) adding to the displayed at least one input image at least one locate mark indicator to provide a digital representation of the at least one physical locate mark applied by the locate technician during the locate operation, thereby generating a marked-up image including the at least one dig area indicator and the at least one locate mark indicator; and D) electronically transmitting and/or electronically storing information relating to the marked-up image so as to generate the searchable electronic record of the locate operation.

A further embodiment of the present invention is directed to an apparatus for facilitating generation of a searchable electronic record of a locate operation performed by a locate technician. The locate operation comprises identifying, using at least one physical locate mark, a presence or an absence of at least one underground facility within a dig area. At least a portion of the dig area may be excavated or disturbed during excavation activities. The apparatus comprises a communication interface; a display device; a memory to store processor-executable instructions; and a processing unit coupled to the communication interface, the display device, and the memory. Upon execution of the processor-executable instructions by the processing unit, the processing unit controls the communication interface to electronically receive source data representing at least one input image of a geographic area comprising the dig area, the at least one input image including at least one dig area indicator to provide at least one indication of the dig area in the displayed at least one input image; processes the source data and controls the display device so as to display at least a portion of the at least one input image including the at least one dig area indicator on the display device; adds to the displayed at least one input image at least one locate mark indicator to provide a digital representation of the at least one physical locate mark applied by the locate technician during the locate operation, thereby generating a marked-up image including the at least one dig area indicator and the at least one locate mark indicator; and further controls the communication interface and/or the memory to electronically transmit and/or electronically store information relating to the marked-up image so as to generate the searchable electronic record of the locate operation.

Another embodiment of the present invention is directed to a method for certifying a locate operation. The locate operation comprises identifying, using at least one physical locate mark, a presence or an absence of at least one underground facility within a dig area. At least a portion of the dig area may be excavated or disturbed during excavation activities. The method comprises A) electronically recalling, via a display device coupled to a central server, a searchable electronic record of a locate operation performed by a locate technician, the searchable electronic record stored in memory associated with the central server. The searchable electronic record comprises (i) a marked-up digital image comprising a digital image of a geographic area comprising the dig area, and at least one digital representation, marked on the digital image of the geographic area, of the at least one physical locate mark, and (ii) a data set associated with the marked-up digital image, the data set including information relating to the locate operation. The method further comprises B) verifying, based at least in part on the electronically recalled searchable electronic record, whether the at least one digital representation of the at least one physical locate mark in the marked-up digital image accurately reflects the presence or the absence of the at least one underground facility within the dig area; C) altering the searchable electronic record, via a user interface device associated with the display device, to indicate completion of B); and D) electronically transmitting and/or electronically storing the altered searchable electronic record so as to facilitate the excavation activities and/or an investigation thereof.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
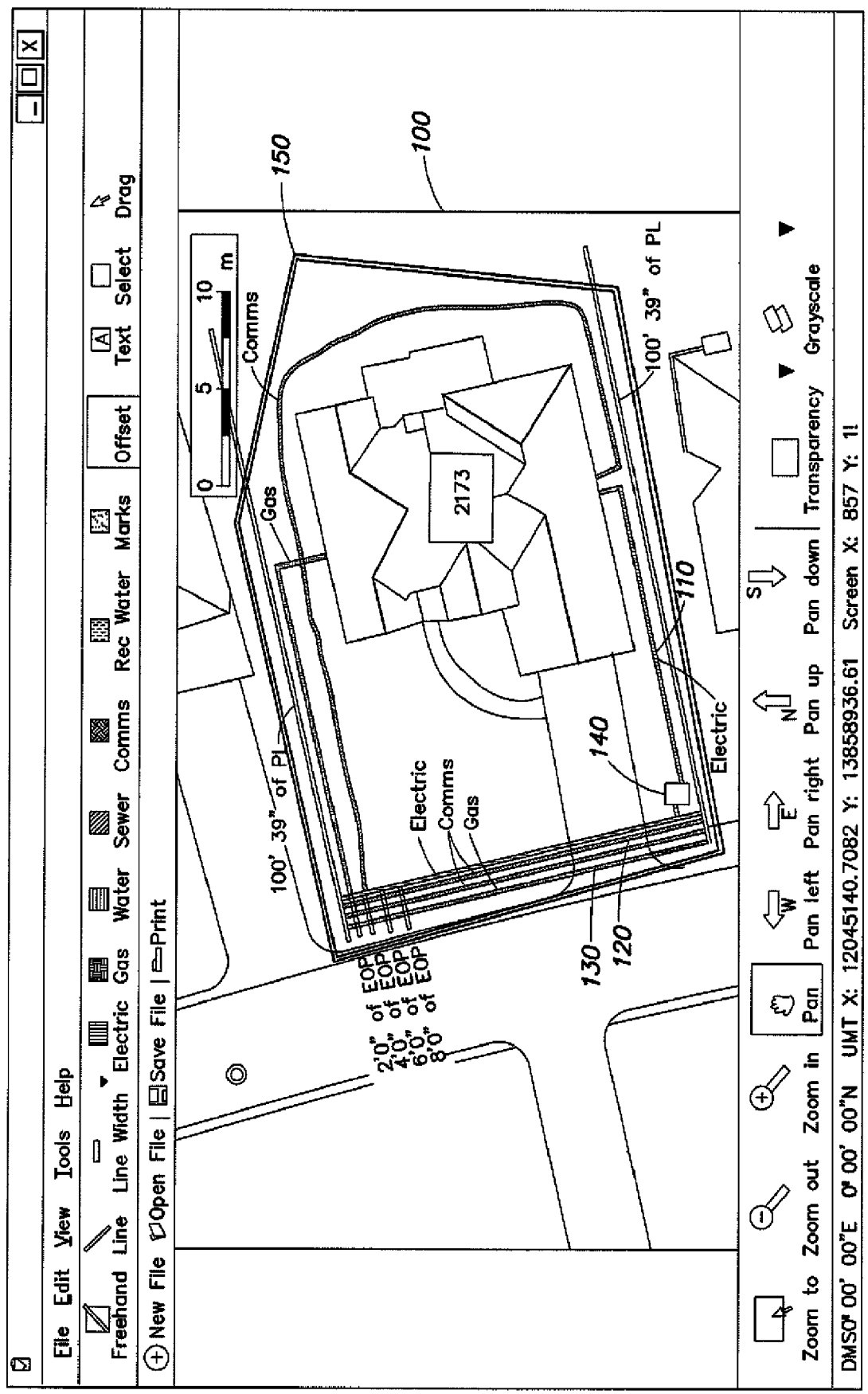
FIG. 1 is a diagram of an exemplary searchable electronic record of a locate operation, according to one embodiment of the present invention.

FIG. 1 is a diagram illustrating an exemplary searchable electronic record, or "electronic manifest," of a locate operation, according to one embodiment of the present invention. When locating underground facilities at a geographic location, such as at a dig area 100 associated with a residence or a business, it may be beneficial to document locate marks in a permanent and reproducible manner. For example, a locate technician may locate and mark underground facilities using a locating device and/or a marking device. A locating device may generally be defined as a locating wand or another device used to detect the presence of underground facilities, while a marking device may generally be defined as any tool (e.g., a paint wand) to apply a physical locate mark, such as paint or other material to a surface. The locate technician may use paint, flags, or some other object with a particular color or other characteristic to mark the location of an underground facility. Referring to the example shown in FIG. 1, the locate technician may use red paint to mark underground power lines 110, orange paint to mark telecommunications (e.g., telephone and/or cable television) lines 120, and yellow paint to mark gas lines 130.

The locate technician may also identify one or more environmental landmarks that are present at or near the dig area and/or determine the distance between the environmental landmark(s) and the located underground facility. For example, a transformer 140 may be indicated as an environmental landmark, as shown in FIG. 1. The geographic location of transformer 140 may be used to measure offsets to other locate marks in the dig area.

As described herein, documentation of some or all of this information regarding a locate operation is created as a searchable electronic record, also referred to herein as "an electronic manifest." An electronic manifest, as used herein, may generally refer to one or more computer-readable files that include some or all of the information in a manifest. The electronic manifest may be created using one or more input images of a dig area, such as dig area 100, that may be combined with other information (e.g., non-image information) that is added by the user (e.g., a locate technician) about the locate operation. In other implementations, an electronic manifest may be created using one or more input images of a dig area combined with information about locate marks that is provided by other sources. Other implementations may use one or more input images of a dig area combined with information that is added by the user and information that is provided by other sources. As used herein, a "user" may refer to any person operating a device to create an electronic manifest, such as a locate technician, a site supervisor, or any other person or group of people.

Accordingly, various embodiments of the present invention are directed to methods, apparatus and systems for creating a searchable electronic record, or "electronic manifest," relating to a geographic area including a dig area to be excavated or otherwise disturbed. As part of the electronic record, the geographic location of one or more physical locate marks, applied to the dig area during a locate operation to indicate a presence (or absence) of one or more located underground facilities, is somehow identified with respect to its immediate surroundings in the geographic area.

To create such an electronic record, in one exemplary implementation one or more input images relating to the geographic area including the dig area may be utilized. For example, source data representing one or more input images of a geographic area including the dig area is received and/or processed so that the input image(s) may be displayed on a display device. The geographic location of the physical locate mark(s) is then indicated in some manner on the displayed input image(s) so as to generate one or more marked-up images constituting at least a portion of the electronic record. For example, geographic locations of the physical locate mark(s) may be indicated in the marked-up image(s) using digital representation(s) of the physical locate mark(s) ("locate mark indicators") that are added to the marked-up image (s). In other implementations, the input image need not necessarily be displayed to add one or more locate mark indicators; for example, geographic information relating to one or more physical locate marks applied to the dig area may be received and locate mark indicator(s) may be added to the input image based on the geographic information, without requiring display of the input image.

In some implementations of the inventive concepts disclosed herein, the searchable electronic record may include a variety of non-image information regarding the locate operation (e.g., a text description of the geographic location of the dig area, an address or lot number of a property within which the dig area is located, geo-encoded information such as geographic coordinates relating to the physical locate mark(s) and/or various aspects of the geographic area surrounding the physical locate mark(s), a timestamp for the locate operation, one or more identifiers for a locate technician and/or a locate company performing the locate operation, information regarding one or more environmental landmarks, etc.). The marked-up image(s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

As may be observed from FIG. 1, an input image serving as a starting point for creating a searchable electronic record according to various embodiments of the present invention may be displayed (e.g., on a laptop computer), and the displayed input image provides a view of the geographic area including dig area 100 (which, in FIG. 1, is essentially an entire property surrounding a building). Various embodiments relating to the inventive concepts disclosed herein enable locate technicians or other users to indicate a geographic location of physical locate mark(s) applied to the dig area during a locate operation on one or more displayed input images. For purposes of the present disclosure, an input image is any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information"). In this manner, a GIS provides a framework for data manipulation and display of images that may facilitate one or more of (a) location verification, (b) location correlation, (c) locational relationships, (d) district coding, (e) route analysis, (f) area analysis and (g) mapping/display creation, for example.

Figure 10:
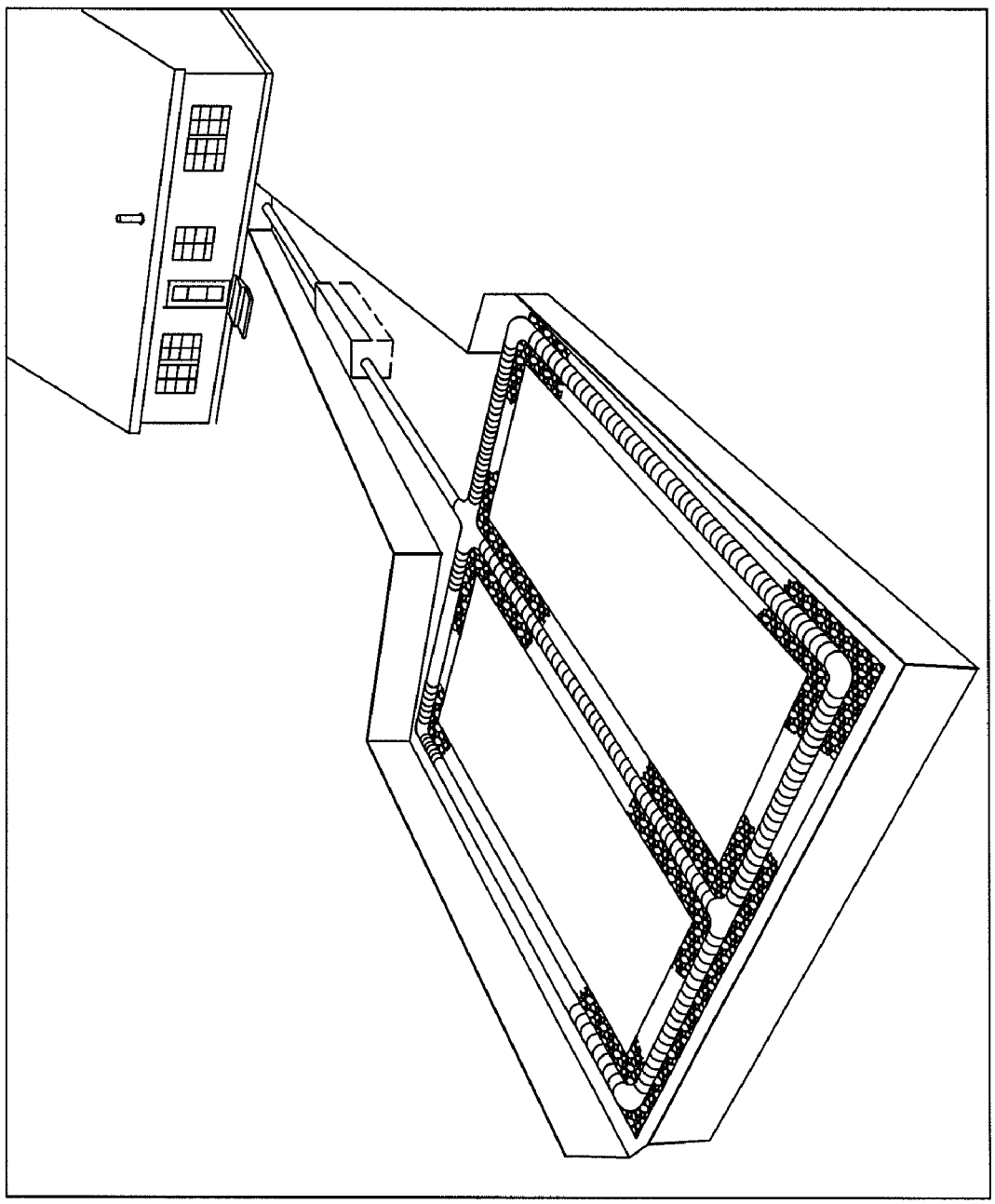
FIG. 10 shows a sketch 1000, representing an exemplary input image.
Figure 11:
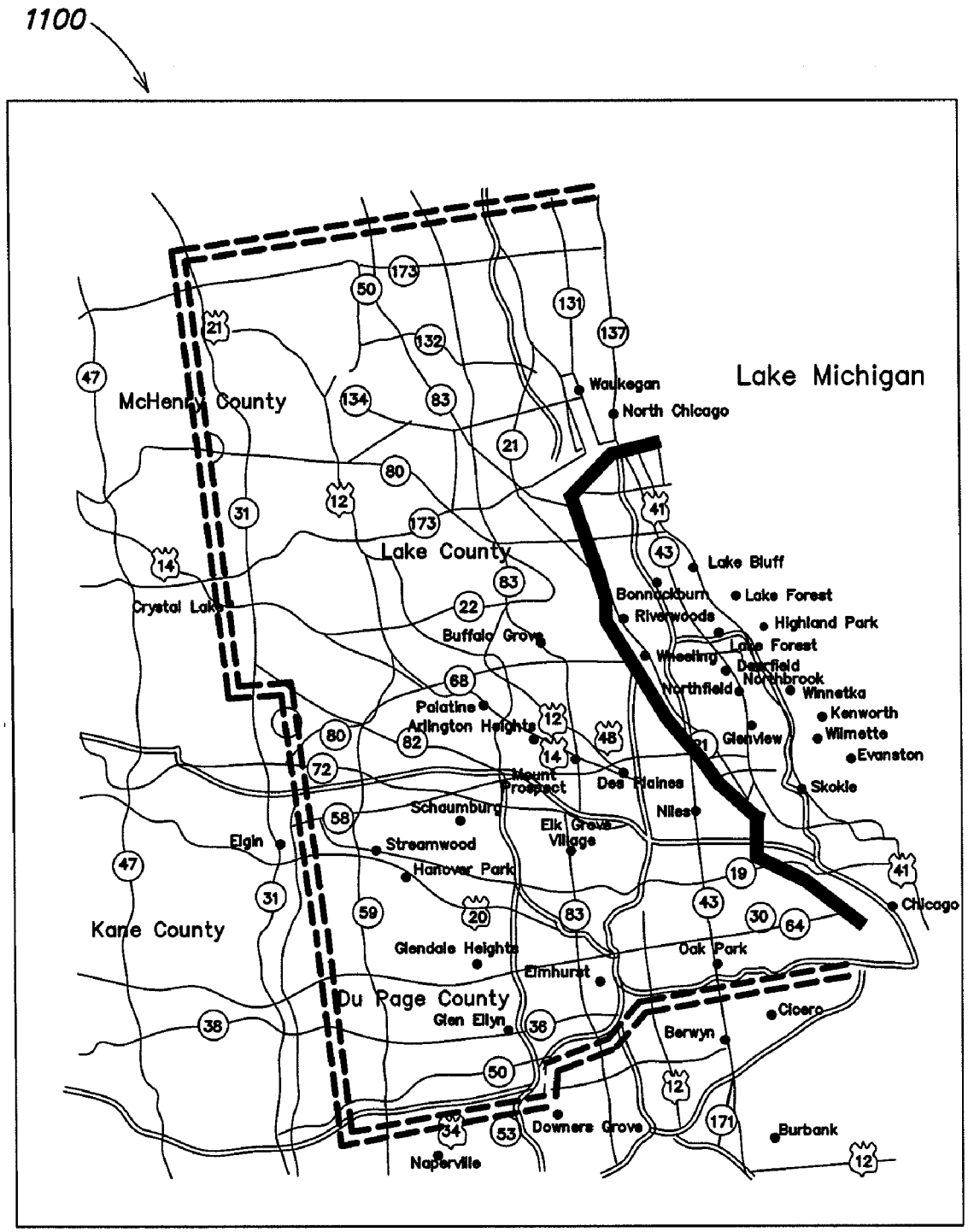
FIG. 11 shows a map 1100, representing an exemplary input image.
Figure 12:
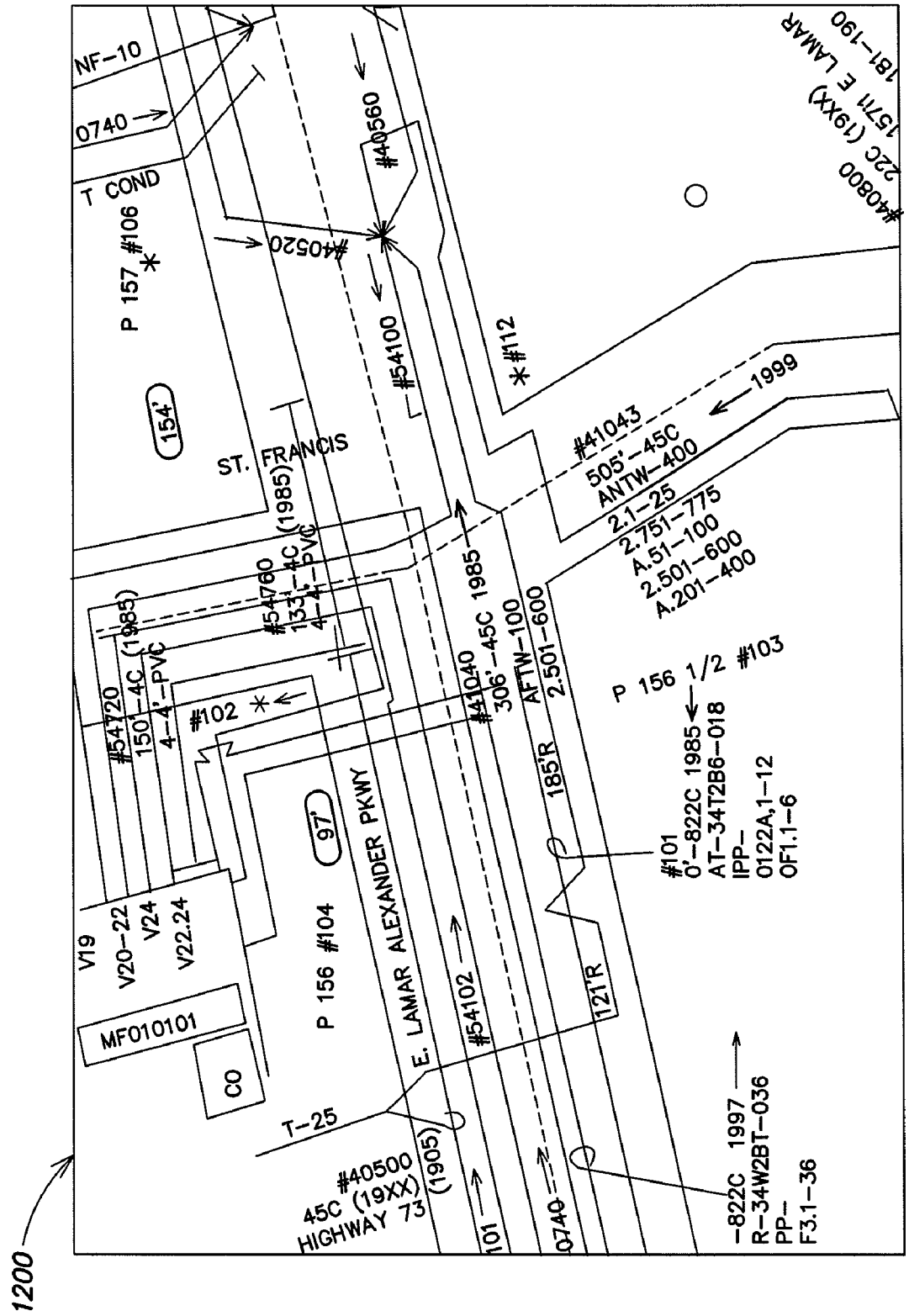
FIG. 12 shows a facility map 1200, representing an exemplary input image.
Figure 13:
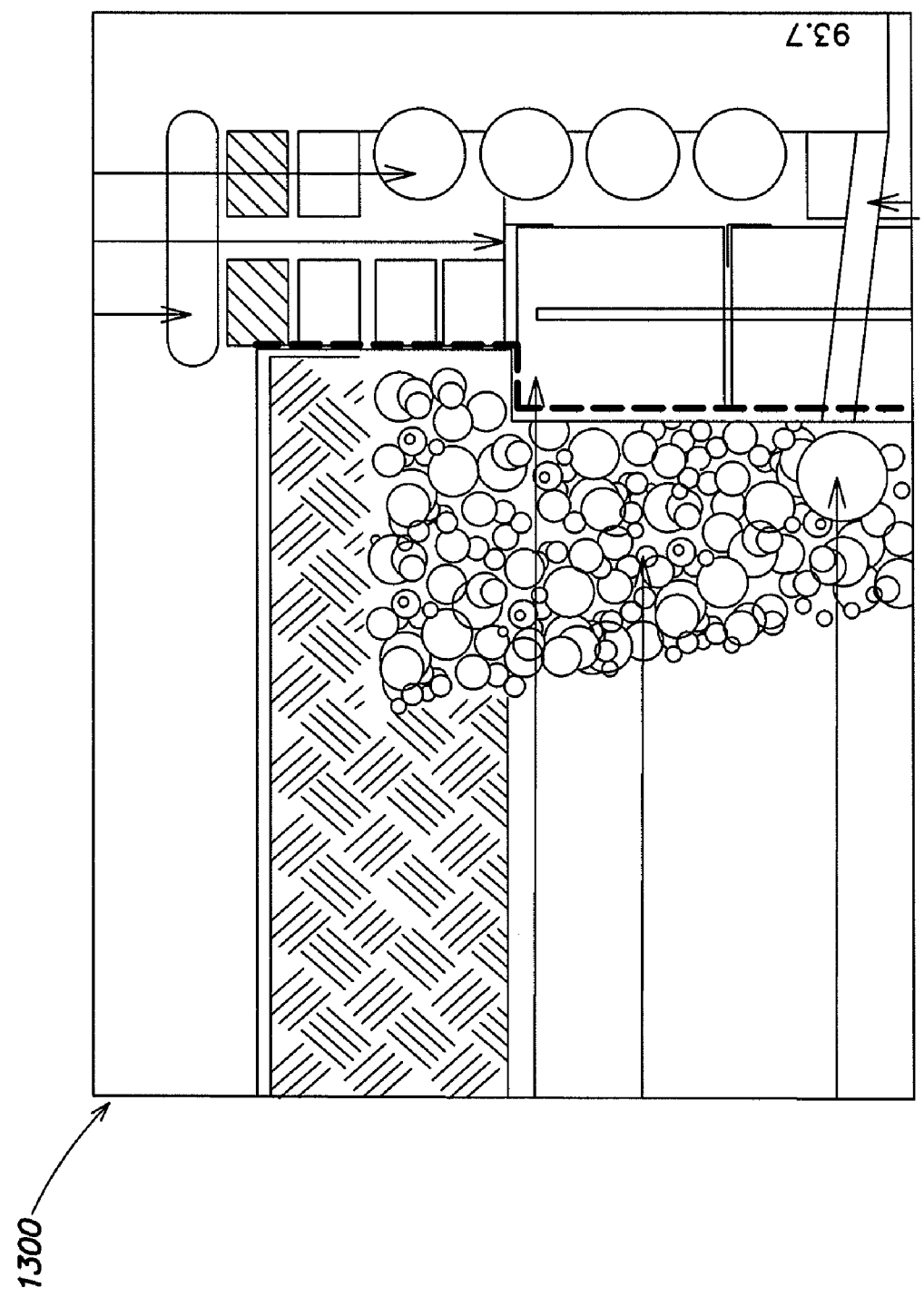
FIG. 13 shows a construction/engineering drawing 1300, representing an exemplary input image.
Figure 14:
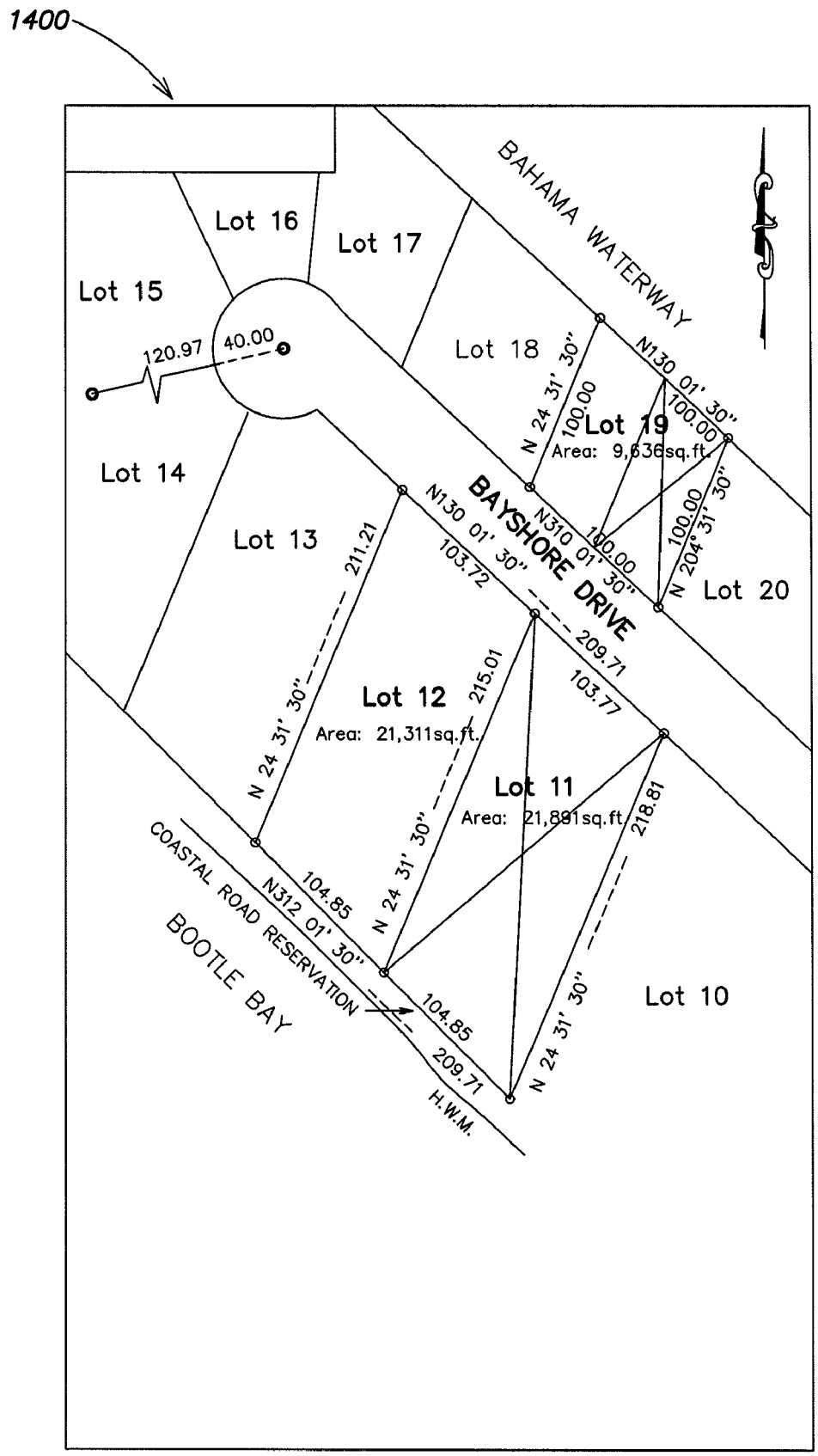
FIG. 14 shows a land survey map 1400, representing an exemplary input image.
Figure 15:
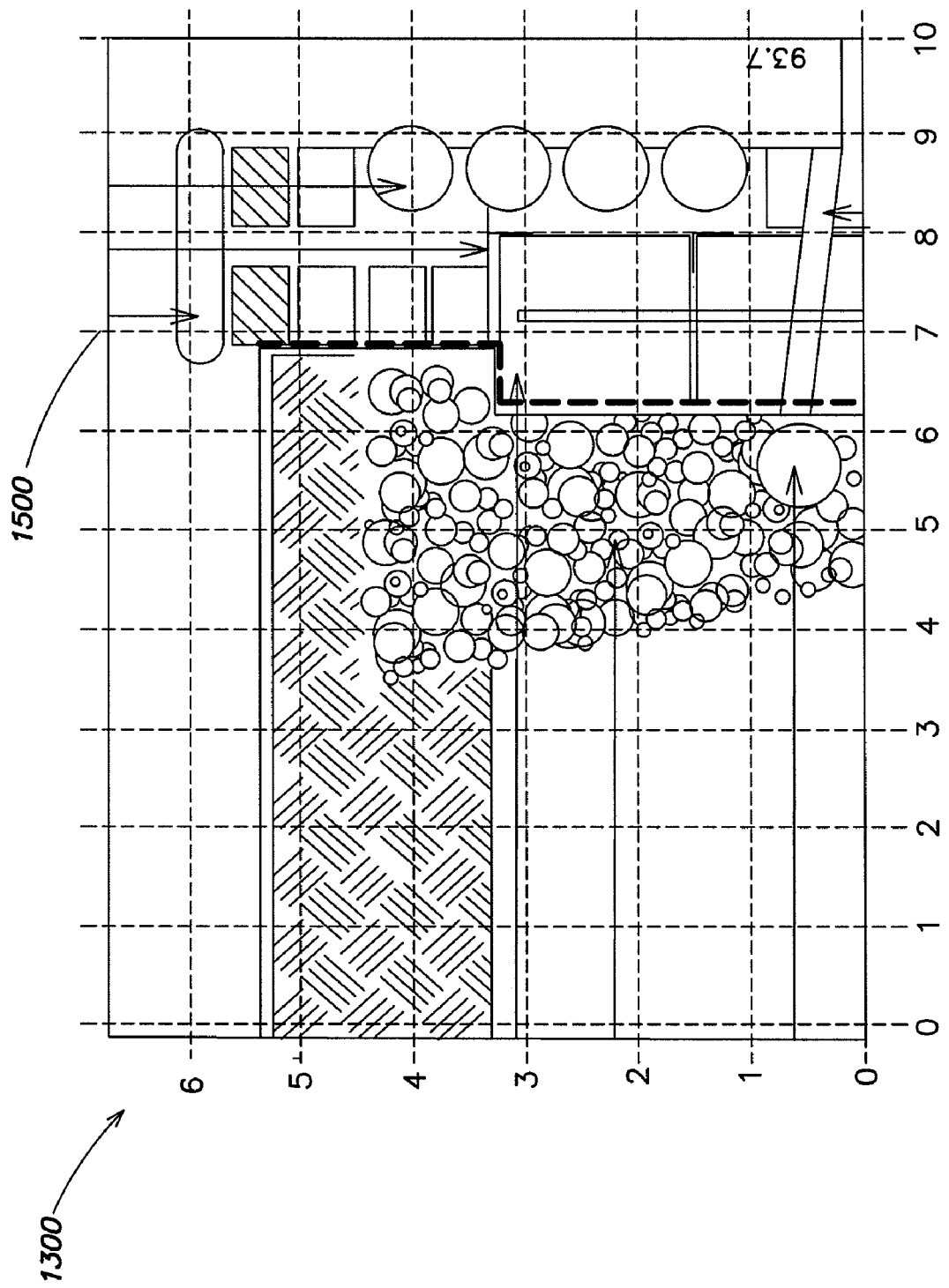
FIG. 15 shows a grid 1500, overlaid on the construction/engineering drawing 1300 of FIG. 14, representing an exemplary input image.
Figure 16:
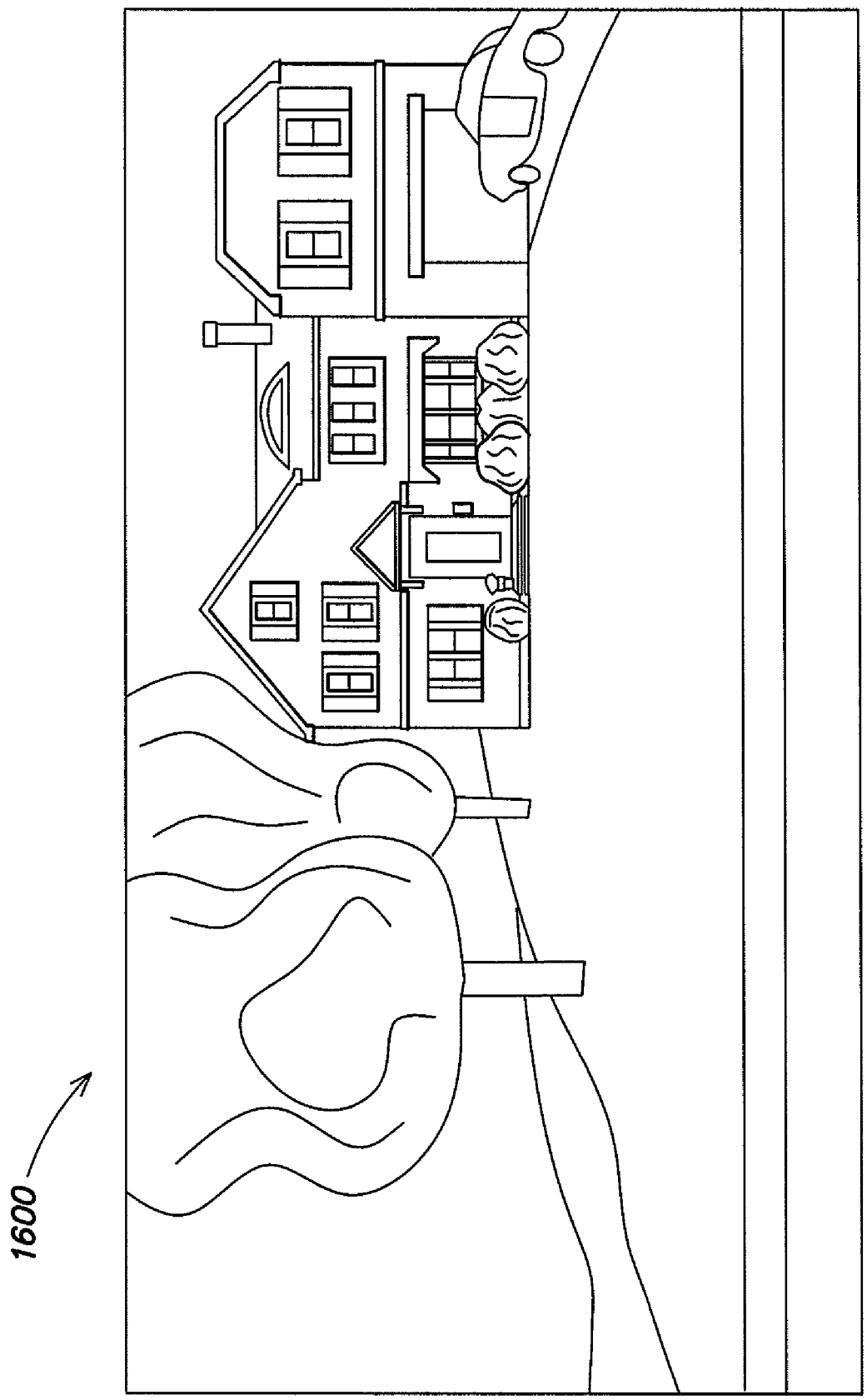
FIG. 16 shows a street level image 1600, representing an exemplary input image.

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.). FIG. 10 shows an exemplary sketch 1000;

Various maps indicating surface features and/or extents of geographical areas, such as street/road maps (e.g., map 1100 of FIG. 11), topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map. An exemplary facility map 1200 is shown in FIG. 12;

Architectural, construction and/or engineering drawings and virtual renditions of a space/geographic area (including "as built" or post-construction drawings). An exemplary construction/engineering drawing 1300 is shown in FIG. 13;

Land surveys, i.e., plots produced at ground level using references to known points such as the center line of a street to plot the metes and bounds and related location data regarding a building, parcel, utility, roadway, or other object or installation. FIG. 14 shows an exemplary land survey map 1400;

A grid (a pattern of horizontal and vertical lines used as a reference) to provide representational geographic information (which may be used "as is" for an input image or as an overlay for an acquired "real world" scene, drawing, map, etc.). An exemplary grid 1500, overlaid on construction/engineering drawing 1300, is shown in FIG. 15. It should be appreciated that the grid 1500 may itself serve as the input image (i.e., a "bare" grid), or be used together with another underlying input image;

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level (see e.g., street level image 1600 of FIG. 16), topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators, or "virtual white lines," that provide one or more indications of or graphically delimit a dig area, as described in U.S. patent application Ser. No. 12/366,853, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

With reference again to FIG. 1, it may be observed that the dig area 100 is indicated in the displayed input image by a dig area indicator or virtual white line 150. As noted above, in one embodiment the input image may have been received with one or more dig area indicators previously provided so that the dig area may be readily identified in the displayed input image. While FIG. 1 illustrates a virtual white line 150 as an essentially continuous line delimiting a boundary of the dig area, it should be appreciated that one or more dig area indicators are not limited in this respect, and that such indicators may include lines having various colors and line-types (dashed, dotted, etc.), drawing shapes, shades, symbols, etc., and need not necessarily delimit an entire boundary of a dig area. Additionally, as also noted above, it should be appreciated that in some embodiments an input image need not include any dig area indicators to provide a foundation for generating a searchable electronic record of a locate operation.

In FIG. 1, digital representations of the physical locate marks applied to a dig area (e.g., corresponding to power lines 110, telecommunications lines 120 and gas lines 130 shown in FIG. 1), may be added to the displayed input image to graphically indicate the geographic locations of the physical locate marks in the dig area 100. Representations of the physical locate marks, also referred to as "locate mark indicators," may be added to the displayed input image through the use of a drawing application or marking tool application, which may superimpose over or otherwise display one or more locate mark indicators on the displayed input image. As used herein, "representations of physical locate marks" or "locate mark indicators" may include lines, drawing shapes, shades, symbols, coordinates, data sets, or other indicators to provide one or more indications of the geographic locations of the physical locate marks on a displayed input image. As discussed further below, a given locate mark indicator may have an associated attribute representing a type of underground facility corresponding to the physical locate mark(s) applied to the dig area. Examples of different attributes for a locate mark indicator include, but are not limited to, color, line-type, symbol-type, shape, shade, etc. (e.g., a first locate mark indicator for a gas line may include a green dashed-line, a second locate mark indicator for a fiber optic cable may include a red dotted-line, a third locate mark indicator for an electric line may include one or more gray diamond shapes arranged along a path traversed in the input image by the buried electric line, etc.).

In some exemplary embodiments described herein, the marked-up images having one or both of locate mark indicators and dig area indicators ("virtual white lines"), as well as non-image information, may form part of the searchable electronic record, and information regarding the searchable electronic record (and in some instances the record itself) may be electronically transmitted and/or stored to facilitate verification of the locate operation. In one implementation, the non-image information may include a series of geographical coordinates representing the locate mark indicator(s). These marked-up images and coordinates enable documentation of where the physical locate marks were made, even after the physical locate marks no longer exist. Such documentation may be important in the event of accidental damage to an underground facility or another event triggering a dispute concerning whether the underground facilities were appropriately marked. Further, documentation provided by the searchable electronic records according to the present disclosure may be helpful for training locate technicians, assessing the quality of locate operations, and ensuring that locate operations have actually and/or accurately been performed without a need to visit the dig site thereafter. An electronic record comprising the marked-up image may be stored for later retrieval, and may be searchable. For example, data embedded within or otherwise associated with the marked-up image may be searchable (e.g., via a search engine) using key words.

Exemplary Network

Figure 2:
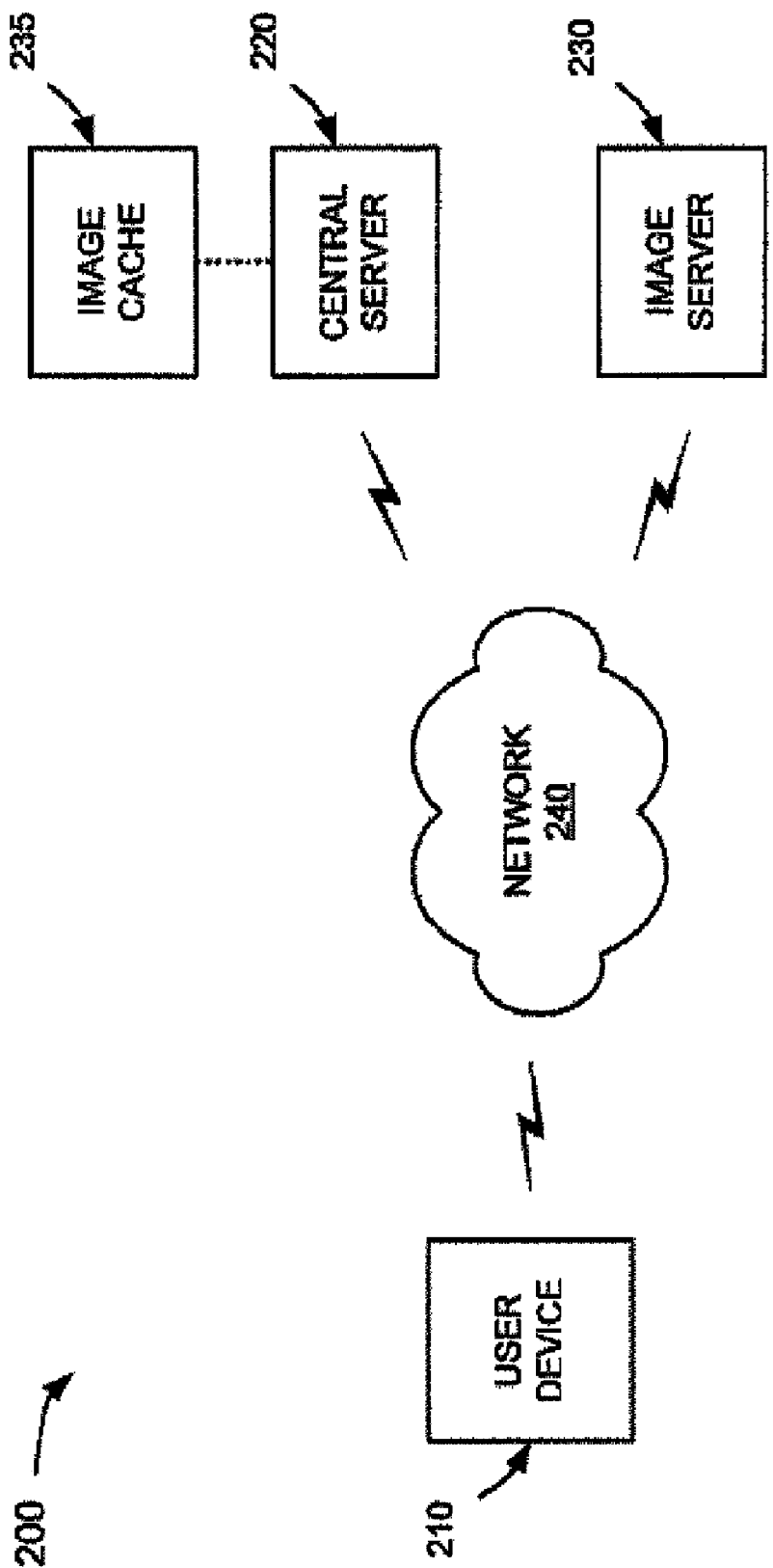
FIG. 2 is a diagram of an exemplary network in which the various inventive concepts described herein may be implemented, according to one embodiment of the present invention.

FIG. 2 is a diagram of an exemplary network 200 in which systems and methods described herein may be implemented. As shown in FIG. 2, the network 200 may include a user device 210 connected to a central server 220 and an image server 230 via a network 240. A single user device 210, central server 220, and image server 230 have been illustrated as connected to network 240 for simplicity. In practice, there may be more or fewer user devices and/or servers. For example, in one alternative implementation, the user device 210 may operate as a comprehensive device and, thus, the network 200 may include no central server, with user device 210 communicating directly through network 240 to image server 230. Also, in some instances, the user device 210 may perform one or more of the functions of the central server 220 and/or central server 220 may perform one or more of the functions of the user device 210. In still another implementation, multiple user devices 210 may be connected to the central server 220 through the network 240.

The user device 210 may encompass a computer device, such as a laptop computer, a small personal computer, a tablet device, a personal digital assistant (PDA), a mobile computing device, a touch-screen device, or generally any device including or connecting to a processor and a display. The user device 210 may be portable so as to be separately carried by the user performing a locate operation. Alternatively, the user device 210 may be integrated with or affixed to another moveable object, such as a vehicle.

The central server 220 may include a computer device that may store information received from or provided to the user device 210 and/or the image server 230. The central server 220 may include storage capacity and/or optionally include networked access to one or more separate hardware components, such as images cache 235, to store cached images and the like.

The image server 230 may include a computer device that may store and provide input images of geographic locations The image server 230 may be associated with the same, or a different, party that maintains the central server 220. For example, the image server 230 may be associated with a party that provides input images for a fee.

The network 240 may include a local area network (LAN), a wide area network (WAN), a telephone network, such as the Public Switched Telephone Network (PSTN) or a cellular network, an intranet, the Internet, a communications link, or a combination of networks. The user device 210, central server 220, and image server 230 may connect to the network 240 via wired and/or wireless connections. The user device 210 and central server 220 may communicate using any communication protocol.

Exemplary User Device Architecture

Figure 3:
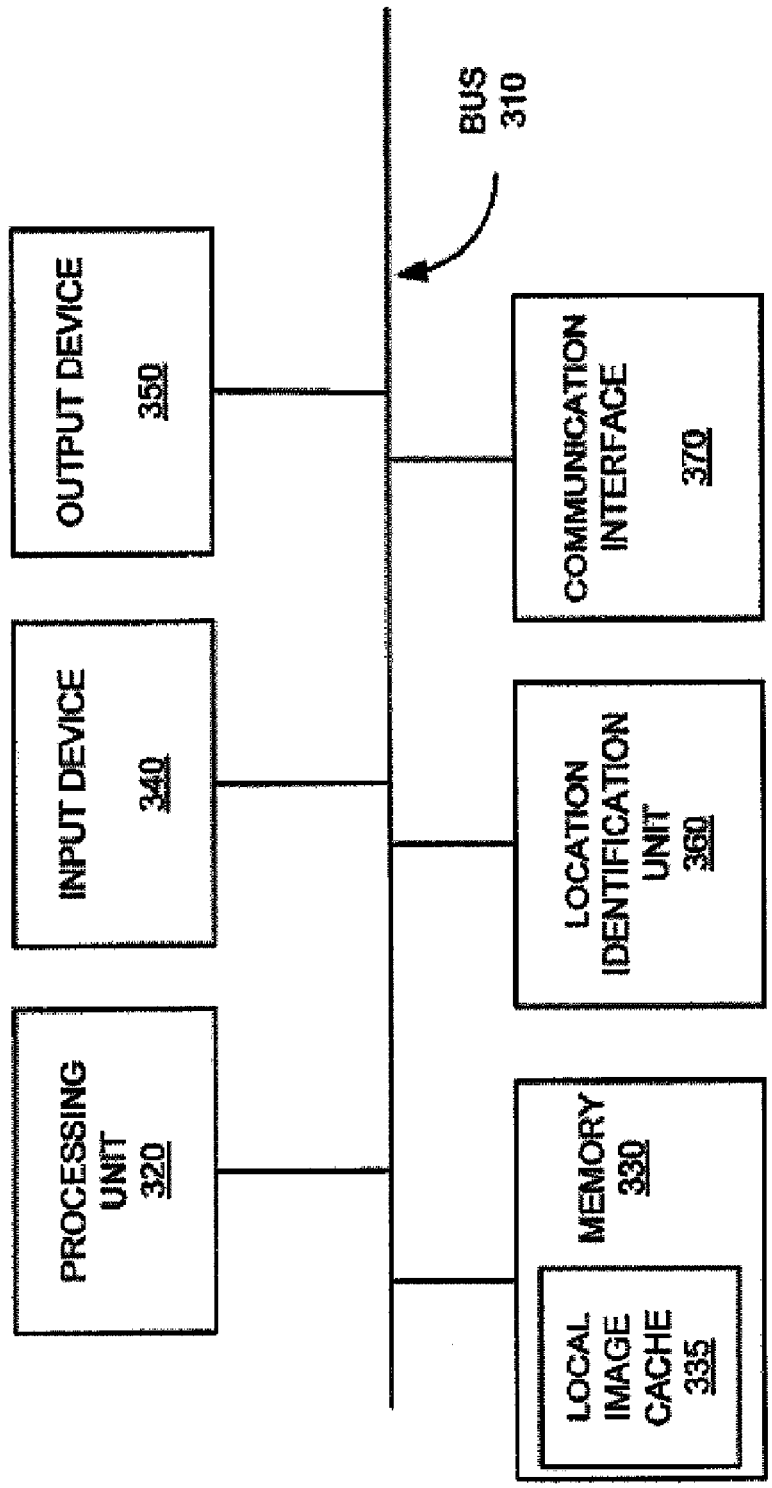
FIG. 3 is a diagram of exemplary components of the user device of FIG. 2.

FIG. 3 is a diagram of exemplary components of the user device 210. The user device 210 may include a bus 310, a processing unit 320, a memory 330, an input device 340, an output device 350 (e.g., a display device), a location identification unit 360, and a communication interface 370. In another implementation, the user device 210 may include more, fewer, or different components. For example, the location identification unit 360 may not be included, or the location identification unit 360 may be included as a device located external to the user device 210, such as a device worn or carried by a user of the user device 210.

The bus 310 may include a path that permits communication among the components of the user device 210. The processing unit 320 may include a processor, a microprocessor, or processing logic that may interpret and execute instructions. The memory 330 may include a random access memory (RAM), a read only memory (ROM), a memory card, a magnetic and/or optical recording medium and its corresponding drive, or another type of memory device. Generally, the memory 330 may be sufficient to store and manipulate input images, such as those stored in a local image cache 335. In one implementation, the local image cache 335 may include one or more input images of a dig area to be marked by a user. In another implementation, the local image cache 335 may include a series of input images that correspond to the geographical region to which a particular user is assigned. For example, local image cache 335 may include a collection of high-resolution images of a particular zip code or town. In still another implementation, the local image cache 335 may include an entire set of input images intended to be made available to multiple users.

The input device 340 may include one or more mechanisms that permit a user to input information to the user device 210, such as a keyboard, a keypad, a touchpad, a mouse, a stylus, a touch screen, a camera, or the like. Alternatively, or additionally, the input device 340 may include a microphone that can capture a user's intent by capturing the user's audible commands. Alternatively, or additionally, the input device 340 may interact with a device that monitors a condition of the user, such as eye movement, brain activity, or heart rate. The output device 350 may include a mechanism that outputs information to the user, such as a display, a speaker, or the like. The condition information may be used to assess the reliability of the user inputs that are used to generate the marked-up image or other aspects of the electronic record. For example, if the monitored heart rate of the user is sufficiently high as to indicate that the user is under stress, the reliability of the user inputs may be assessed as poor.

The location identification unit 360 may include a device that can determine its geographic location to a certain degree of accuracy, such as a global positioning system (GPS) or a global navigation satellite system (GNSS) receiver. In another implementation, the location identification unit 360 may include a device that determines location using another technique, such as tower (e.g., cellular tower) triangularization. The location identification unit 360 may receive location tracking signals (e.g., GPS signals) and determine its location based on these signals. In one implementation, location identification unit 360 may be capable of determining its location within approximately thirty centimeters or less.

The communication interface 370 may include any transceiver-like mechanism that enables user device 210 to communicate with other devices and/or systems. For example, the communication interface 370 may include mechanisms for communicating with another device or system via a network. For example, the communication interface 370 may enable communications between the user device 210 and the central server 220 and/or image server 230 over network 240.

As will be described in detail below, user device 210 may perform certain operations relating to the documentation of locate operations and/or the creation of an electronic manifest. User device 210 may perform these operations in response to the processing unit 320 executing software instructions contained in a computer-readable medium, such as the memory 330. A computer-readable medium may be defined as a physical or logical memory device.

The software instructions may be read into the memory 330 from another computer-readable medium, or from another device via the communication interface 370. The software instructions contained in the memory 330 may cause processing unit 320 to perform processes that will be described later. Alternatively, hardwired circuitry may be used in place of, or in combination with, software instructions to implement processes described herein. Thus, implementations described herein are not limited to any specific combination of hardware circuitry and software.

Exemplary Central Server Architecture

Figure 4:
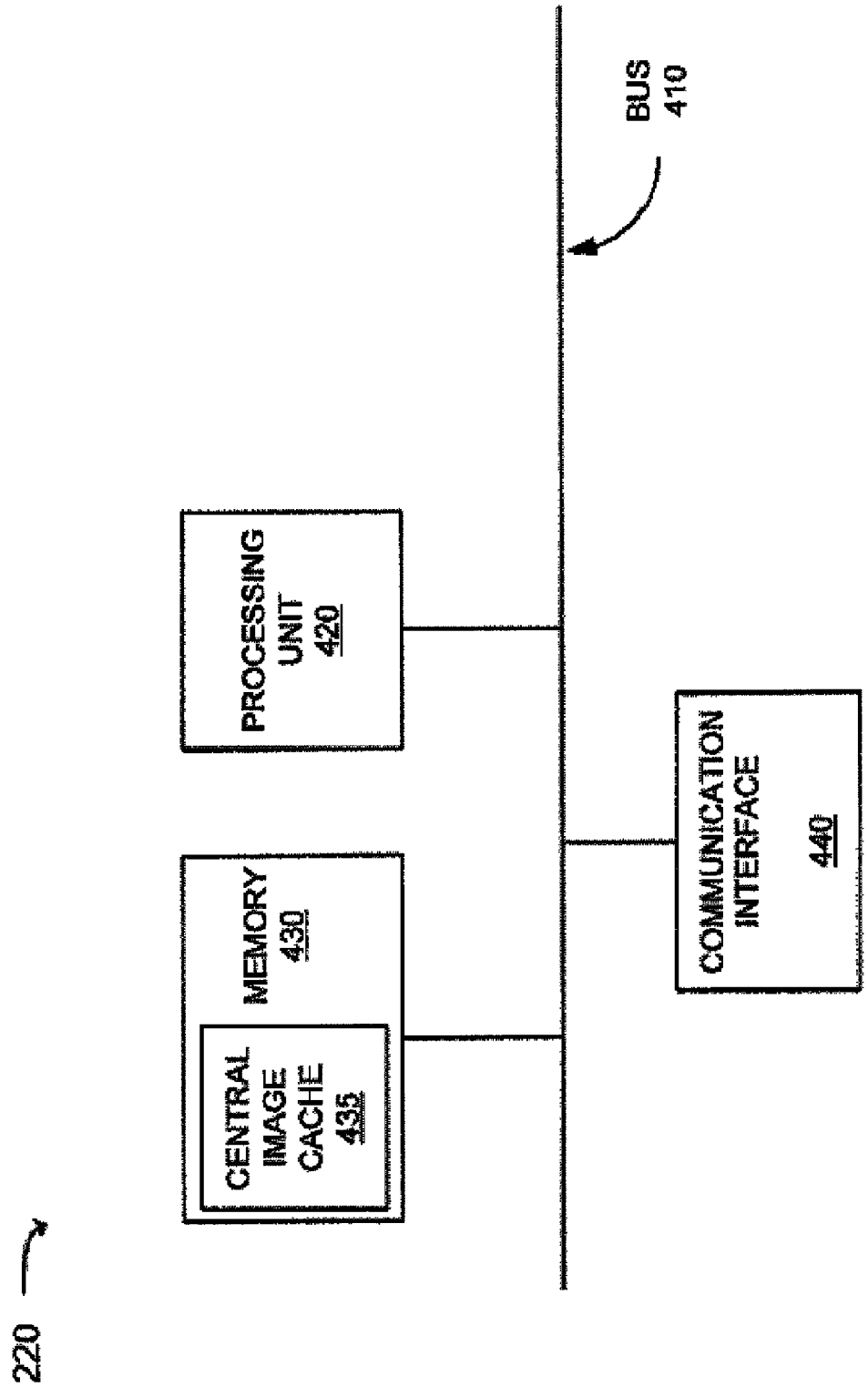
FIG. 4 is a diagram of exemplary components of the central server of FIG. 2.

FIG. 4 is a diagram of exemplary components of the central server 220. The central server 220 may include a bus 410, a processing unit 420, a memory 430, and a communication interface 440. In another implementation, the central server 220 may include more, fewer, or different components. For example, an input device and/or an output device (not shown) may be included, as necessary.

The bus 410 may include a path that permits communication among the components of the central server 220. The processing unit 420 may include a processor, a microprocessor, or processing logic that may interpret and execute instructions. The memory 430 may include a magnetic and/or optical recording medium and its corresponding drive, a RAM, a ROM, a memory card, or another type of memory device suitable for high capacity data storage. Generally, the memory 430 may be sufficient to store input images of particular geographic locations, such as those stored in a central image cache 435. In one implementation, the central image cache 435 may include a set of input images that correspond to the geographical regions to which a group of users are assigned. In still another implementation, the central image cache 435 may include the entire set of input images intended to be made available to any of a group of users. For example, central image cache 435 may include a collection of high-resolution input images of a particular county, state or other geographic region. In another implementation, as shown in FIG. 2, central image cache 435 may be replaced or supplemented with one or more networked storage components, such as image cache 235.

The communication interface 440 may include any transceiver-like mechanism that enables the central server 220 to communicate with other devices and/or systems. For example, the communication interface 440 may include mechanisms for communicating with another device or system via a network. For example, the communication interface 440 may enable communications between the central server 220 and the user device 210 and/or image server 230 over network 240.

As will be described in detail below, the central server 220 may perform certain operations to facilitate the documentation of locate operations and/or the creation of an electronic manifest. The central server 220 may perform these operations in response to the processing unit 420 executing software instructions contained in a computer-readable medium, such as the memory 430.

The software instructions may be read into the memory 430 from another computer-readable medium, or from another device via the communication interface 440. The software instructions contained in the memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Exemplary Routines

Figure 5:
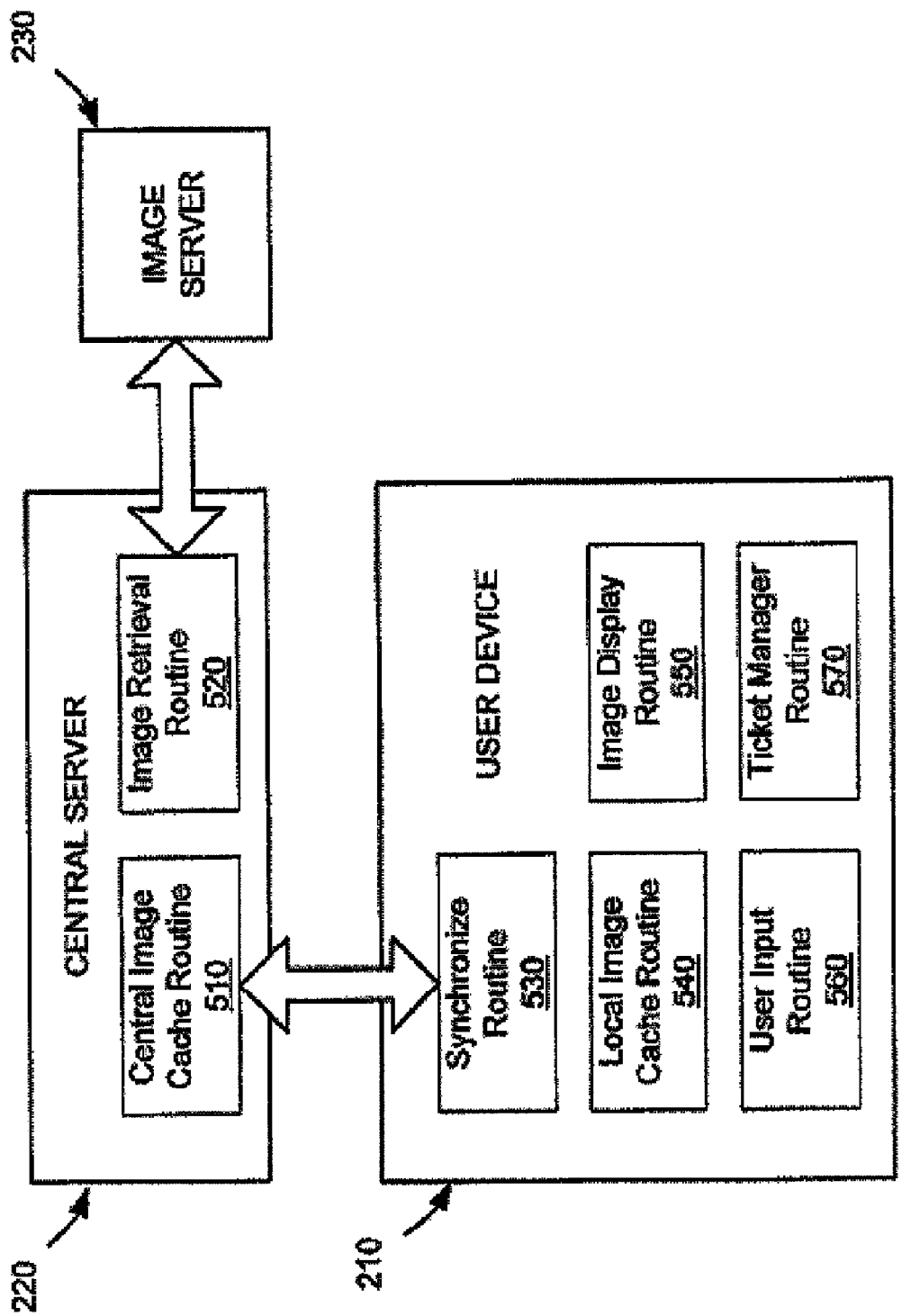
FIG. 5 is a diagram of exemplary software routines for components of FIG. 2.

FIG. 5 is a diagram of exemplary software routines for the components shown in FIG. 2. The central server 220 may include an image retrieval routine 520 and a central image cache routine 510. The user device 210 may include a synchronize routine 530, a local image cache routine 540, an image display routine 550, a user input routine 560, and a ticket manager routine 570. As discussed in more detail herein, the examples of routines associated with the central server 220 and the user device 210 may be interchangeable between each hardware component. Furthermore, some or all of routines 510, 520, 530, 540, 550, 560, and 570 need not be performed exclusively by any one hardware component.

Still referring to FIG. 5, the image server 230 may store a library of input images. Generally, input images such as aerial images may be of sufficient resolution at an optimal elevation to be useful as a record of the locate operation. The input images from the image server 230 may include geocoding or other geographical identification metadata and may be provided in any computer-readable format, such as JPEG file interchange format (JPEG), tagged image file format (TIFF), portable document format (PDF), graphics interchange format (GIF), bitmap (BMP), portable network graphics (PNG), Windows® metafile (WMF), and/or the like. Also, input images from the image server 230 may include a combination of images or overlays, such as overlays of street names, regions, landmark descriptions, and/or other information about areas displayed in an image. The input images from the image server 230 may be supplied by a third-party provider if the coverage area of the third-party image provider overlaps with the desired area of the user.

The central image cache routine 510 and the image retrieval routine 520 of the central server 220 may include a variety of functionalities. In certain implementations, the central image cache routine 510 may receive information about specific tickets and parse tickets in order to discern location information. For example, a ticket may identify the dig area by an address of the property or by geographic coordinates. The ticket might specify, for example, the address or description of the dig area to be marked, the day and/or time that the dig area is to be marked, and/or whether the user is to mark the dig area for telecommunications (e.g., telephone and/or cable television), power, gas, water, sewer, or some other underground facility.

The central image cache routine 510 may also convert dig area location information to latitude/longitude coordinates or other coordinates. When location information from a ticket is sufficiently precise to allow for identification of corresponding imagery, the central image cache routine 510 may calculate the image extent (which may be generally defined as the bounding region of the dig area of interest), and update the ticket with the calculated extent. In one implementation, the central image cache routine 510 may determine image date, coordinates, and resolution of each image that may be stored in the central image cache 435 or in another location. In another implementation, when location information from a ticket is imprecise (or "fuzzy"), the central image cache routine 510 may mark the ticket to indicate that no corresponding image was able to be retrieved based on the ticket information.

In another implementation, central image cache 510 may identify an image to retrieve based on GPS coordinates of a GPS-enabled device associated with a user. For example, a user may arrive at an excavation site in a UPS-enabled vehicle and the GPS information from the vehicle may be used to identify coordinates corresponding to an image to be retrieved. GPS coordinates may also be obtained from other GPS-enabled devices being used by or in the vicinity of the user. As used herein a GPS-enabled device may include any device or combination of devices capable of interfacing with a global navigation satellite system, geo-spatial positioning system, or other location-identification system to determine a location. Examples of GPS-enabled devices may include a marking device (e.g., a paint wand) with an integrated GPS receiver; a locating device (e.g., a locating wand) with a UPS receiver; a wearable GPS-enabled device; a vehicle-mounted GPS system; certain PDAs, computers, and cellular telephones; and stand-alone GPS-enabled systems.

In still another implementation, central image cache 510 may identify one or more images to request based on a designated geographical area assigned to a user. For example, a user may be assigned to work in several dig areas associated with a particular section of a neighborhood. The user may input coordinates associated with the entire selected section of the neighborhood, and central image cache 510 may then retrieve images for those coordinates.

The image retrieval routine 520 catalogues and stores images from the image server 230 to the central server 220. For example, images may be stored in the central image cache 435 in the memory 430 of the central server 220. In one implementation, the image retrieval routine 520 may query the central image cache 435 or other cache for an image associated with a particular dig area relating to a ticket of interest, and determine, based on (for example) the age and resolution of the cached image, whether the image in the central image cache 435 needs to be updated from the image server 230.

In another implementation, the image retrieval routine 520 may interface with multiple image providers and image servers 230. The image retrieval routine 520 may determine which image provider is the best source for the image corresponding to a particular dig area relating to a ticket of interest based on algorithms that factor, for example, each image provider's geographical coverage, image resolution, cost, and availability. Regarding geographical coverage, it will be beneficial to confirm that the image provider's area of coverage includes the desired extent (in other words, the entire geographical region of interest to the user).

Regarding image resolution, available resolution may be measured in meters (or centimeters, feet, or inches) per pixel. For example, one provider may offer thirty centimeters per pixel, while another offers fifteen centimeters or less per pixel, for the same coverage area. If an image is requested at a standard altitude, then the image retrieval routine 520 may choose a pre-defined optimal scale (for example, thirty centimeters per pixel for a rural area, but fifteen centimeters per pixel for an urban area) and determine which provider provides images at the pre-defined optimal scale. Alternatively, if the image of interest is at a less granular scale (for example, a community or neighborhood image that allows the locator to pan around the image), then resolution may not be a significant factor.

Regarding cost, the image retrieval routine 520 may have access to pricing information for a variety of image providers. The image retrieval routine 520 may identify which provider has the lowest cost for the desired image. Cost analysis may be based on images desired for an individual ticket or the algorithm may account for a group of image requests, including volume incentives and/or penalties from each image provider Regarding availability of image providers, the image retrieval routine 520 may identify what providers are available and/or operational. Also, if an image provider has a regular latency profile (for example, if a provider has a particular server that is busiest 3-5 PM Pacific time), then the image retrieval routine 520 may manage requests to be provided to another image provider or to a particular server of that image provider to efficiently load share the image retrieval.

When an image provider is selected, the image retrieval routine 520 may download the image from the selected image provider's server, which may be an image server 230. The downloaded image may be stored locally, for example, in the central image cache 435.

It should be understood that some of the routines and/or functionalities described above with respect to the central image cache routine 510 and the image retrieval routine 520 may be performed by one or both of the routines 510 and 520 above, and the arrangement of functionalities are not limited to the implementations disclosed herein.

The synchronize routine 530 for user device 210 may ensure that images already stored and manipulated on the user device 210 correspond to images stored in the central server 220. When a user performing a locate operation identifies a ticket or dig area, the synchronize routine 530 may check if an image exists in the central server 220 that matches the extent requested, and if the matching image is up-to-date in, for example, the local image cache 335. The synchronize routine 530 may also synchronize images from the central server 220 cache and store copies locally in the user device 210.

If the ticket has a valid extent (i.e., a recognizable boundary), the local image cache routine 540 may associate the ticket information with an image matching the extent. The local image cache routine 540 may load the image from the local image cache 335. If the ticket does not have a valid extent the local image cache routine 540 may accept address information that is entered by the user. Alternatively, the local image cache routine 540 may read the local address information from the ticket or from a GPS-enabled device in communication with the user device 210 so that address information may be pre-entered for the user to the extent possible. Address information may include, for example, a street address, street name, city, state and/or zip code. If either none or multiple stored addresses appear to be associated with particular address information, the local image cache routine 540 may display a list of best match addresses from which a user can select.

Once an image is loaded from the local cache 335, image display routine 550 may provide a variety of view options for the user. For example, the image display routine 550 may support zooming in and out of the image by changing the image scale. Also, the image display routine 550 may support panning horizontally and vertically in the image. Furthermore, the image display routine 550 may support "roaming" outside the boundaries of the initial extent. Roaming generally occurs when the user zooms or pans, such that images beyond the boundaries of the stored images may be required to be retrieved (using, for example, synchronize routine 530) from either the local image cache 335 or the central server 220. The additional images retrieved from either the local image cache 335 or the central server 220 may be displayed and stitched together to display a complete image.

The user input routine 560 allows the user to add information to the image to create an electronic manifest. The user input routine 560 may accept user input from, for example, input device 340, and may support the addition of lines, freehand forms (or scribbling), shapes such as circles and rectangles, shading, or other markings which denote the approximate location of underground facilities which are present within the dig area. A drawing shape may generally be any kind of drawing shape or mark. The user input routine 560 may further enable drawing of underground facility locate marks for telecommunications (e.g., telephone and cable television), gas, power, water, sewer, and the like, so that each type of drawn locate mark is distinguishable from the other (s). The user input routine 560 may limit the display of such facilities by the type of work which is to be performed according to the instructions included within the user's assigned ticket. Accordingly, a given locate mark indicator, serving as a digital representation of a physical locate mark applied to the dig area, may have an associated attribute representing a type of underground facility corresponding to the physical locate mark. Examples of different attributes for a locate mark indicator include, but are not limited to, color, line-type, symbol-type, shape, shade, etc. (e.g., a first locate mark indicator for a gas line may include a green dashed-line, a second locate mark indicator for a fiber optic cable may include a red dotted-line, a third locate mark indicator for an electric line may include one or more gray diamond shapes arranged along a path traversed in the input image by the buried electric line, etc.).

In addition to the marking of the underground facility locate marks on the input image, user input routine 560 may also include offsets from environmental landmarks that may be displayed on the image in, for example, English or metric units. Environmental landmarks may also be marked and/or highlighted on the input image. The user input routine 560 may also accept positioning information from external sources, such as a GPS-enabled device. The user input routine 560 may further include features to annotate the image with text and to revise user inputs by, for example deleting, dragging or pasting shapes. In one implementation, when the user zooms the image view in or out, user input (e.g., lines and/or shapes) that have been added to the original image may adhere to the changing image scale and remain in the original user-input locations.

The electronic manifest, which is a compilation of one or more input images and user inputs, may be saved as an image file. In another implementation, the user inputs may be saved in a mark-up format, including the geo-coordinates and underground facility type of each input.

In one implementation, the user device 210 may interface with a ticket management program for coordinating multiple tickets. The ticket manager routine 570 may facilitate such an interface. The ticket management program for coordinating multiple tickets may reside on the central server 220, for example, or on a separate server that is accessible to the user device 210. Generally, tickets may be stored on a central server and assigned to a user. When a user edits a ticket, the user may also have created an electronic manifest associated with the ticket. The ticket manager routine 570 may allow the user to synchronize the user's ticket cache with the company's central database and also synchronize the images and user input. The ticket manager routine 570 may copy images from the central server 220 to the user device 210 for new tickets, and will copy the user input from the user device 210 to the central server 220 for completed tickets. The ticket manager routine 570 may interface with the routines described above to correlate a user's assigned tickets with images for those tickets and download the images to the user device from the central server 220. The ticket manager routine 570 may retrieve the corresponding ticket number from the ticket management program when the user retrieves an image, or the ticket manager routine 570 may retrieve the image corresponding to an entered ticket number.

Figure 6:
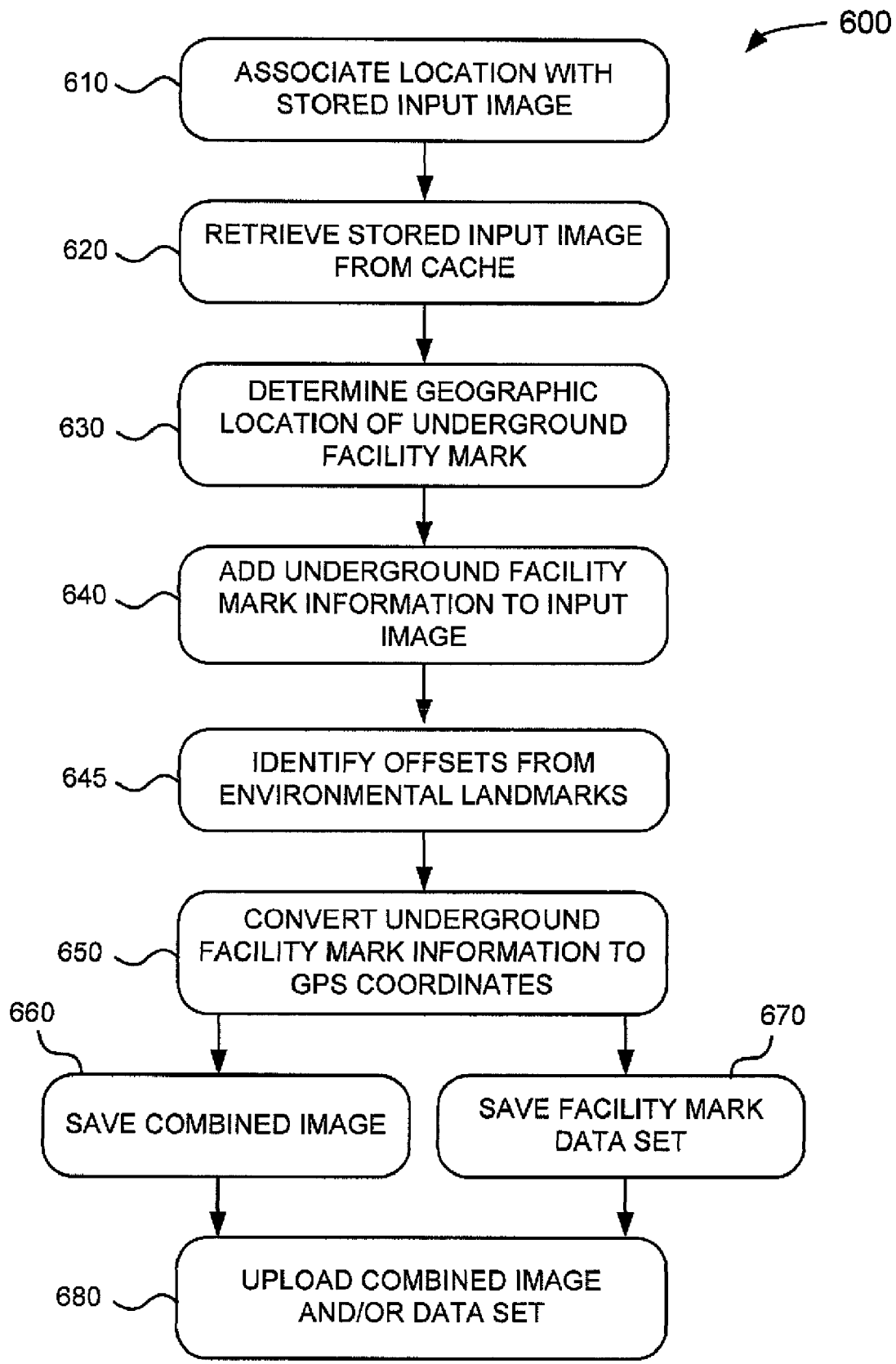
FIG. 6 is a flowchart of an exemplary process for creating an electronic manifest of underground facility locate marks, according to one embodiment of the present invention.

FIG. 6 provides a flowchart 600 of an exemplary process for creating an electronic manifest relating to a locate operation and the application of locate marks to a dig area to indicate a presence (or absence) of one or more underground facilities. In one implementation, at least some of the blocks of FIG. 6 may be performed using user device 210 (FIG. 2). In another implementation, one or more of the blocks of FIG. 6 may be manually performed or performed by another device, such as central server 220.

The process 600 may begin with a user being dispatched to a dig area to be located, in response to a locate request ticket being generated for a locate operation. For example, the user might be given a ticket that identifies what underground facilities the user needs to locate at the dig area. The ticket might specify, for example, the address or description of the dig area to be located, the day and/or time that the dig area is to be located, and/or whether the user is to locate the dig area for telecommunications, power, gas, water, sewer, or other underground facility. Based on information in the ticket, or other information about the dig area to be located, user device 210 in block 610 may associate the property address with a stored input image of the dig area. Such association may include associating the address with geographic location information, such as global positioning coordinates for the dig area extent (or boundary).

In one exemplary embodiment, the locate request ticket may be an electronic locate request ticket that comprises a previously marked-up image of a geographic area including the dig area, on which one or more dig area indicators, or "virtual white lines," were placed (e.g., by an excavator or a one-call center) to provide an indication of the dig area. In this manner, an electronic locate request ticket received by a locate company or locate technician may include both image data and non-image data; for example, a locate request ticket may include a marked-up image with one or more dig area indicators, as well as associated non-image information providing additional details of the locate operation to be performed, as noted above. Further details of locate request tickets including marked-up images with one or more dig area indicators are given in U.S. patent application Ser. No. 12/366,853, filed Feb. 6, 2009, entitled "Virtual White Lines for Indicating Planned Excavation Sites on Electronic Images," which application is incorporated by reference herein.

In block 620, the stored input image associated with the dig area to be located is retrieved from a cache of images and loaded into the user device 210. As previously described and discussed herein with respect to FIG. 5, the cache of images may reside within the user device 210, the central server 220, a separate image server, or another storage device. As discussed above, the input image may be represented by a wide variety of source data that, when processed, facilitates display of the input image. In one exemplary implementation, the input image for the searchable electronic record may be a previously marked-up image with one or more dig area indicators or virtual white lines; in one aspect, such an input image may be received as part of the locate request ticket specifying the locate operation. In various implementations, it should be appreciated that the input image may or may not be displayed, as discussed further below.

In block 630, the user may perform a locate operation to locate the underground facilities present within the dig area and mark the located underground facilities using a locating device and/or marking device, or a combined locating/marking device. For example, the user may use the locating device to identify an underground facility at the dig area, and may use the marking device to mark the underground facility with the appropriate marker (e.g., color paint, flag, or some other object). In certain implementations, information regarding the approximate geographic location of the applied underground facility locate marks may be gathered and stored electronically using a GPS-enabled device or other location identification device. The approximate geographic location of the underground facility locate marks may be determined, for example, by identifying the current geographic location of the GPS-enabled device as the user performs the locating or marking. In another implementation, a user may use a triangularization technique to determine the approximate geographic location of the underground facility locate marks. In yet another implementation, a user may determine latitude and longitude coordinates or some other measurement of a geographic location.

In block 640, information about the approximate geographic location of the underground facility locate marks may be added to the input image that was retrieved previously in block 620. The information about the approximate geographic location of the underground facility locate marks may be input by the user using an input device, such as input device 340 (FIG. 3) of user device 210, and added to the displayed input image as one or more locate mark indicators. In one exemplary implementation in which the input image is a previously marked-up image having one or more dig area indicators, this image may be further marked-up to add one or more locate mark indicators that are displayed together with the one or more dig area indicators. Additional aspects regarding information to be input by the user are discussed in more detail herein with respect to FIG. 8.

Still referring to block 640, information about the approximate geographic location of the underground facility locate marks may also be received directly from a GPS-enabled device, such as the GPS-enabled locating device or marking device used in block 630, and overlaid on the input image. In one exemplary implementation, one or more locate indicator marks based on this information may be added to the input image automatically, and in some instances without any requirement to display the input image. Alternatively, the user may use of a combination of received GPS information and manual entries to create an electronic manifest of the underground facility locate marks.

In block 645, as an optional step, information about offsets of the underground facility locate marks from environmental landmarks may be added to the input image. As with the input of the facility locations in block 640, the location of the environmental landmarks may be input by the user using an input device, such as input device 340 (FIG. 3) of user device 210, or automatically input from a GPS-enabled device. The offset information may be automatically calculated or input by the user. Offset information may also be obtained by identifying selected environmental landmarks on the retrieved image and automatically calculating the distance from the selected environmental landmarks to the underground facility locate marks overlaid on the image.

In block 650, as an optional step, information about the location of the underground facility locate marks (e.g., the locate mark indicators added to the input image) may be converted to GPS coordinates. In block 660, the marked-up input image and other information (e.g., non-image information) about the location operation may be stored in memory as a searchable electronic record or "electronic manifest," which may be formatted as a single combined image (e.g., image data and non-image metadata) or as separate image data and non-image data that are linked. In exemplary implementations, the electronic manifest may be stored as, for example, a digital image or an interactive electronic map. Additionally or alternatively, in block 670, the geographical coordinates of the underground facility locate marks may be stored in memory, such as memory 330 (FIG. 3), as a separate data set. The data set may be compiled as, for example, a database of GPS coordinates. In block 680, the combined image and/or separate data set may optionally be transmitted to a central location, such as central server 220 (FIG. 2).

Thus, the marked-up image(s) and the non-image information may be formatted in a variety of manners in the searchable electronic record; for example, in one implementation the non-image information may be included as metadata associated with the marked-up image(s), while in other implementations the marked-up image(s) and the non-image information may be formatted as separate data sets. These separate data sets may be transmitted and/or stored separately. In another aspect, whether transmitted/stored separately or together, the marked-up image(s) and the non-image information may be linked together in some manner as relating to a common electronic record.

In some locate operations, no underground facilities are determined to be present in a designated dig area. Such locate operations are sometimes referred to as "clears." In some implementations of the inventive concepts discussed herein, an input image may nonetheless be employed to provide an electronic record of a "clear;" more specifically, although no locate mark indicators may be added to an input image (i.e., the step 640 may not be necessary because there are no physical locate marks to digitally represent), other non-image information associated with the "clear" locate operation (e.g., a timestamp of when the locate operation was performed, an identifier for a technician or locate company performing the locate operation, a text address or other geographical identifier for the dig area, a location stamp, etc.) may be associated with the input image (e.g., as a separate data set linked to the input image, as metadata, a combined file of image and non-image data, etc.) to create a searchable electronic record that may be consulted to verify that the locate operation was indeed completed, even though no underground facilities were found.

Figure 7:
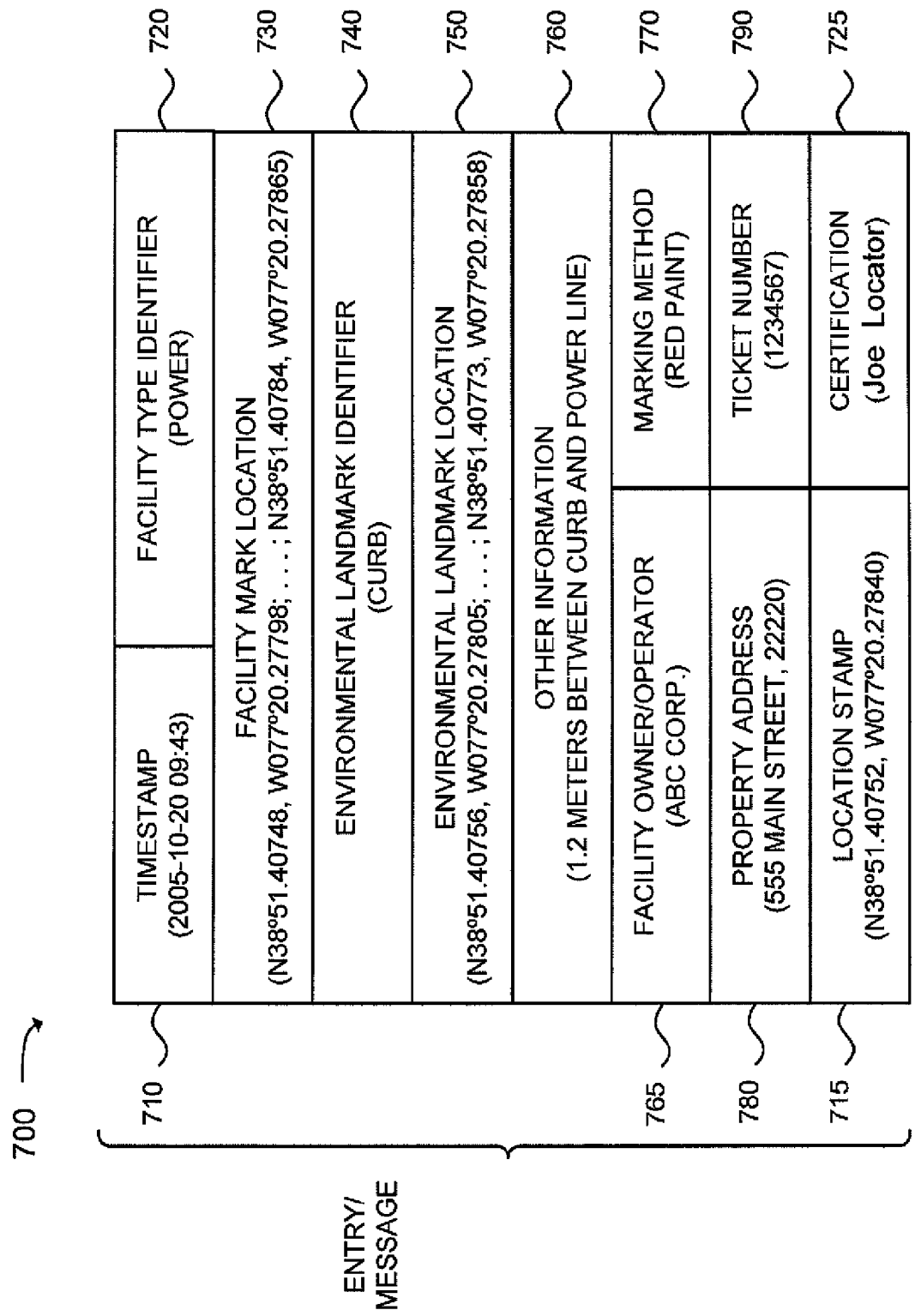
FIG. 7 is a diagram of an exemplary data set that may be stored in the memory of FIG. 3 and/or FIG. 4, according to one embodiment of the present invention.

FIG. 7 is a diagram of an exemplary data set that may be stored in memory 330 and/or transmitted to server 220. As shown in FIG. 7, a data set 700 may include a timestamp field 710, an underground facility identifier field 720, an underground facility location field 730, an environmental landmark identifier field 740, an environmental landmark location field 750, an other information field 760, a facility owner/operator field 765, a marking method field 770, a property address field 780, a ticket number field 790, a location stamp field 715, and a certification field 725. In another implementation, the data set 700 may include additional, fewer, or different fields.

Timestamp field 710 may include time data that identifies the day and/or time that a locate operation was performed. This may coincide with a time at which an environmental landmark location was identified in connection with the dig area. The time data in timestamp field 710 is shown in FIG. 7 as 9:43 a.m. on Oct. 20, 2005—although any type of date and/or time code may be used. The information in timestamp field 710 may be useful in establishing when a locate operation occurred.

The underground facility identifier field 720 may include an identifier that uniquely identifies the type of underground facility that was marked. The identifier in underground facility identifier field 720 is shown in FIG. 7 as "power"—although any type of identifier may be used. Underground facility location field 730 may include geographic location information corresponding to an underground facility locate mark. In one implementation, the geographic location information may include a set of geographic points along the marking path of the located underground facility. The geographic location information in underground facility location field 730 is shown in FIG. 7 as N38°51.40748, W077°20.27798; . . . ; N38°51.40784, W077°20.27865—although any type of geographic location information may be used. The information in underground facility location field 730 may be useful in graphically presenting the underground facility locate marks on a map, and/or to verify that the locate operation was actually and accurately performed. Additionally, or alternatively, underground facility location field 730 may include geographic location information for multiple underground facility locate marks.

Environmental landmark identifier field 740 may include an identifier that uniquely identifies the type of environmental landmark being marked. The identifier in environmental landmark identifier field 740 is shown in FIG. 7 as "curb"—although any type of identifier may be used.

Environmental landmark location field 750 may include geographic location information corresponding to the environmental landmark identified in environmental landmark identifier field 740. The geographic location information in environmental landmark location field 750 is shown in FIG. 7 as N38°51.40756, W077°20.27805; . . . ; N38°51.40773, W077°20.27858—although any type of geographic location information may be used.

Other information field 760 may store other data that may be useful, including user notes, such as offset or distance information that identifies a distance between one or more environmental landmarks and one or more underground facility locate marks. Other information field 760 is shown in FIG. 7 as including "1.2 meters between curb and power line"—although any other data may be used. Additionally and/or alternatively, other information field 760 may include audio/voice data, transcribed voice-recognition data, or the like to incorporate user notes.

The underground facility owner field 765 may include the name of the owner/operator of the underground facility that has been marked during the locate operation. For example, in FIG. 7, the underground facility owner field 765 is shown as "ABC Corp." Because multiple underground facilities may be marked during a single locate operation, it may be beneficial to associate each marked underground facility with a particular owner/operator. Alternatively, this field may include one or more identifiers for the locate company performing the locate operation, or an additional field may be added to the data set 700 for this purpose.

Marking method field 770 may indicate the type of marking used at the dig area to indicate the location of an underground facility. For example, in FIG. 7, marking method field 770 is shown indicating red paint. Property address field 780 may be the property address associated with the marking recorded in the data set 700. The property address field 780 may include, for example, the street address and zip code of the property. Other information in field 780 may include city, state, and/or county identifiers. The ticket number field 790 may include the ticket number associated with the locate operation, such as ticket "1234567" shown in FIG. 7.

Location stamp field 715 may include a location stamp indicating a location where the locate operation was performed (e.g., the dig area). The location stamp may optionally be generated at the same time as timestamp 710, and the information underlying these stamps may be from a same source or otherwise correlated, such that the location stamp reflects the location of the locate technician, user device, or associated locate and/or marking device when the timestamp 710 is generated. The location stamp may comprise, for example, location coordinates (as shown in FIG. 7), a city name or designation, a state name or designation, a county name or designation, and/or an address. Generally, the location stamp identifies the presence and location of a locate technician in connection with the locate operation.

According to one exemplary implementation, location stamp data is generated by the user device (e.g., by location identification unit 360) in response to an action associated with a locate operation (e.g., a marking being made on the electronic manifest, creation of a new electronic manifest, completion or certification of an electronic manifest). According to another exemplary implementation, location stamp data is generated by a GPS-enabled device associated with a locate technician dispatched to perform a locate operation (e.g., a GPS-enabled device in the vehicle and/or on the person of the locate technician), a GPS-enabled locate and/or marking device operated by the technician during the locate operation, or another locate and/or marking device capable of determining its own location. The location stamp data may then be transmitted from the GPS-enabled device or locate and/or marking device to the user device alone or in association with other data (e.g. marking data or locate data). The transmission may occur, for example, in response to a request by the user device, a request by the user, or some triggering action. The location stamp data may be recorded to the data set automatically (e.g., without user intervention) or in response to user input.

It should be appreciated that both the timestamp field 710 and location stamp field 715 may optionally include a plurality of timestamps and location stamps. For example, each of a plurality of actions (e.g., markings on the electronic manifest, actuations of the locate and/or marking device) may be associated with a particular time stamp and/or location stamp recorded in fields 710 and 715 so that the time and location of various actions associated with the locate operation can subsequently be determined. The actions may cause the time stamp and/or location stamp to automatically be logged. Further, the timestamp field 710 and/or location stamp field 715 may optionally be "read only" fields. Prohibiting changes to these fields (e.g., by the locate technician) may preserve the integrity of the data therein so that it can be reliably used for verification of the locate operation.

Certification field 725 may comprise a certification of the data in data set 700, e.g., by the locate technician and/or another reviewer, such as a supervisor or other authorized representative of the locate company. Such a certification may comprise a signature, initials, an electronic stamp, or some other indication that the information in the data set 700 is "certified" (e.g., has been reviewed and/or is correct/approved).

In one implementation, the user device 210 may store multiple data sets corresponding to multiple underground facilities identified at a particular dig area. User device 210 may provide the data sets to server 220 in a batch—such as a batch corresponding to the group of underground facilities documented within the electronic manifest—or individually. The batch may be grouped together with other information generally relating to the locate operation, such as the name of the company responsible for performing the locate operation, the name of the locate technician, and the like. Additionally, or alternatively, the other information generally relating to the locate operation may be included in each data set.

Figure 8:
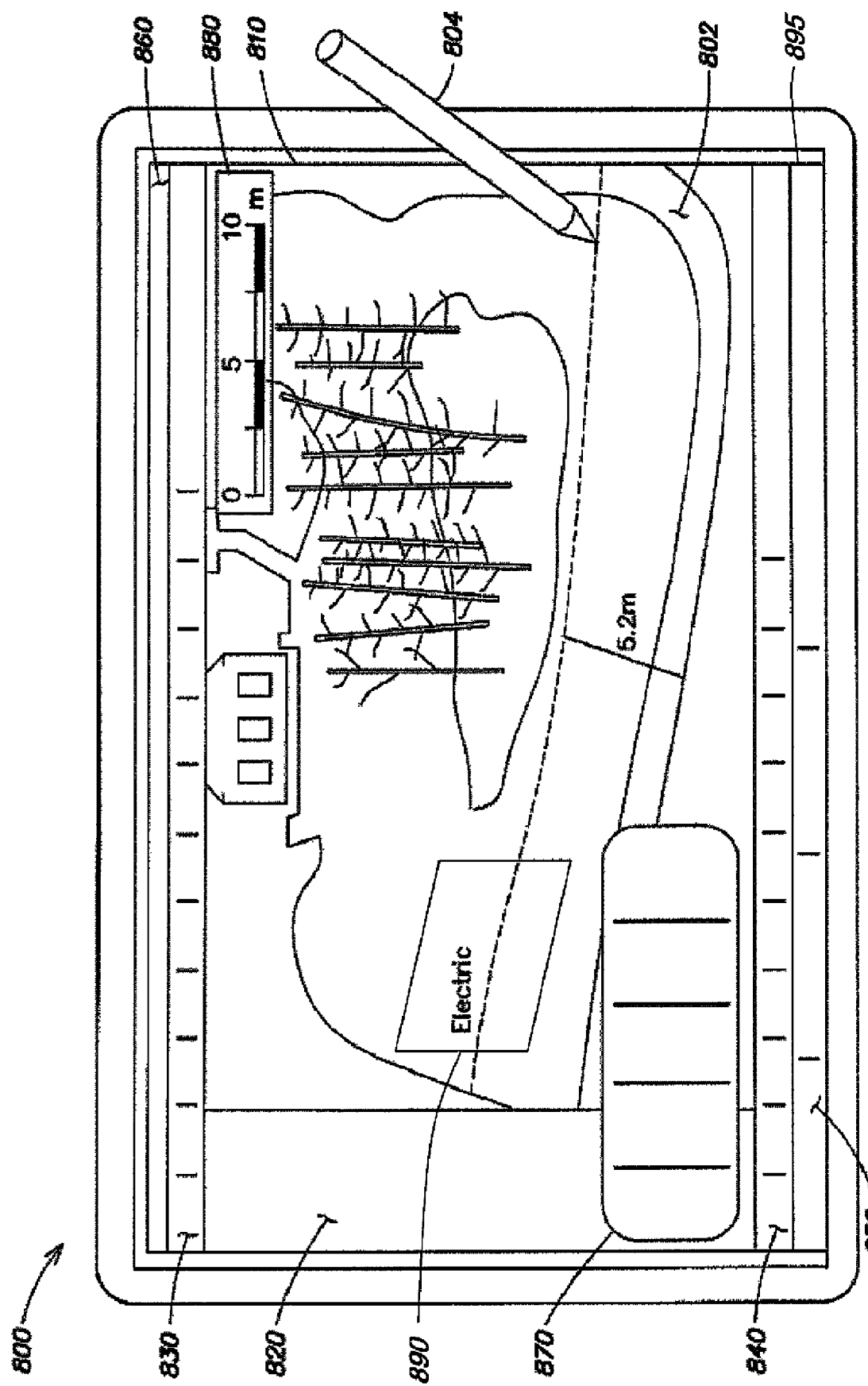
FIG. 8 is a diagram of an exemplary user interface that may be presented via the user device of FIG. 2, according to one embodiment of the present invention.

FIG. 8 an exemplary diagram of a user interface 800 that may be presented via the user device 210. The user interface may be presented on a screen 800 that may be the screen of the user device 210, as described herein with respect to FIG. 2. The screen 800 may display a variety of graphical elements, including but not limited to: a map control 810, an address search panel 820, a locator palette 830, a navigation palette 840, a status bar 850, a menu bar 860, a service grid 870, a scale bar 880, and the input image of the geographic area including the dig area. As discussed above, the displayed input image may include one or more dig area indicators or virtual white lines 890 to identify the dig area in the displayed image.

Map control 810 generally may be the surface, or canvas, where images—such as an exemplary image 802—are displayed. The user may draw or input shapes "on top of" this surface using for example, the input device 340 of FIG. 3 to identify underground facility locate mark locations. FIG. 8 shows a stylus 804 as an exemplary form of input device 340.

The address search panel 820 may be used to identify images corresponding to a desired address. Panel 820 may, for example, accept a partial or complete address and allow the user to search for matches. If an excessive number of addresses match the search, then the size of the result set may be constrained. Address search results may be displayed which match the address search. The listed matches may serve as a springboard for displaying the image desired by the user. For example, when the user taps with a stylus 804 on an address match, the user device 210 may load the image corresponding to the selected address. As described above, this image may be stored locally on user device 210 or retrieved from central server 220.

Palettes may be generally defined as a toolbar or toolbars containing soft buttons or other controls that are grouped in some logical order. The buttons on a palette may duplicate the commands available on the menu bar 860. The locator palette 830 may allow the user to select the type of underground facility locate marks (e.g., electric, gas, water, sewer, telecommunications, etc.) the user will draw on the image 802. The locator palette 830 may also include a choice of various shapes or shades, such as freestyle, line, circle, rectangle, or other polygon that the user may select to draw on the image 802. In one implementation, the locator palette 830 may present a list of potential environmental landmark identifiers. In this case, the user may select an environmental landmark identifier from the list to overlay at the appropriate place on the input image 802.

The locator palette 830 may also include an offset tool that allows the user to mark the distance between, for example, an environmental landmark identifier and a drawn underground facility locate mark. Once the user has chosen the type of shape they wish to draw (freestyle, line, polygon, shading etc.) the application may track the user's movements to define the layout and location of the shape. The shape may be completed when the user terminates the drawing (for example, by lifting the stylus 804 or releasing the mouse button). A text label or other indicator may be added to the shape automatically based on the type of underground facility locate mark or environmental landmark selected (e.g., "electric" or "curb") or may be manually added.

The navigation palette 840 may allow the user to zoom or pan the image 802. For example, the navigation palette 840 may include selections to zoom in, zoom out, or zoom to a selected section of the image. The navigation palette 840 may also include pan command buttons to pan left, pan right, pan up or pan down. Other selections that may be available on the navigation palette include buttons to alter the transparency of either the image 802 or the underground facility locate marks.

The status bar 850 may display information about the map control, such as the coordinates of the subject area, the coordinates of a cursor or stylus in relation to the image 802, and the image scale. The menu bar 860 may include an operating system element that allows a user to access commands, such as exiting the application, selecting what palettes or panels to display, or accessing online help.

The service grid 870 is shown as an exemplary "floating" window to show how the user interface for the screen 800 may operate in a typical operating system environment. The service grid 870 or any of the other graphical elements described in relation to screen 800 may be in a fixed or floating orientation. As underground facility locate marks are drawn on the map control 810, they may appear in a list in the service grid 870. Thus, the user may edit the properties of an underground facility shape using the service grid 870, as well as by selecting the shape in the map control 810. The service grid may include properties, such as the type, length, circumference, and material of the marked underground facility.

Figure 9:
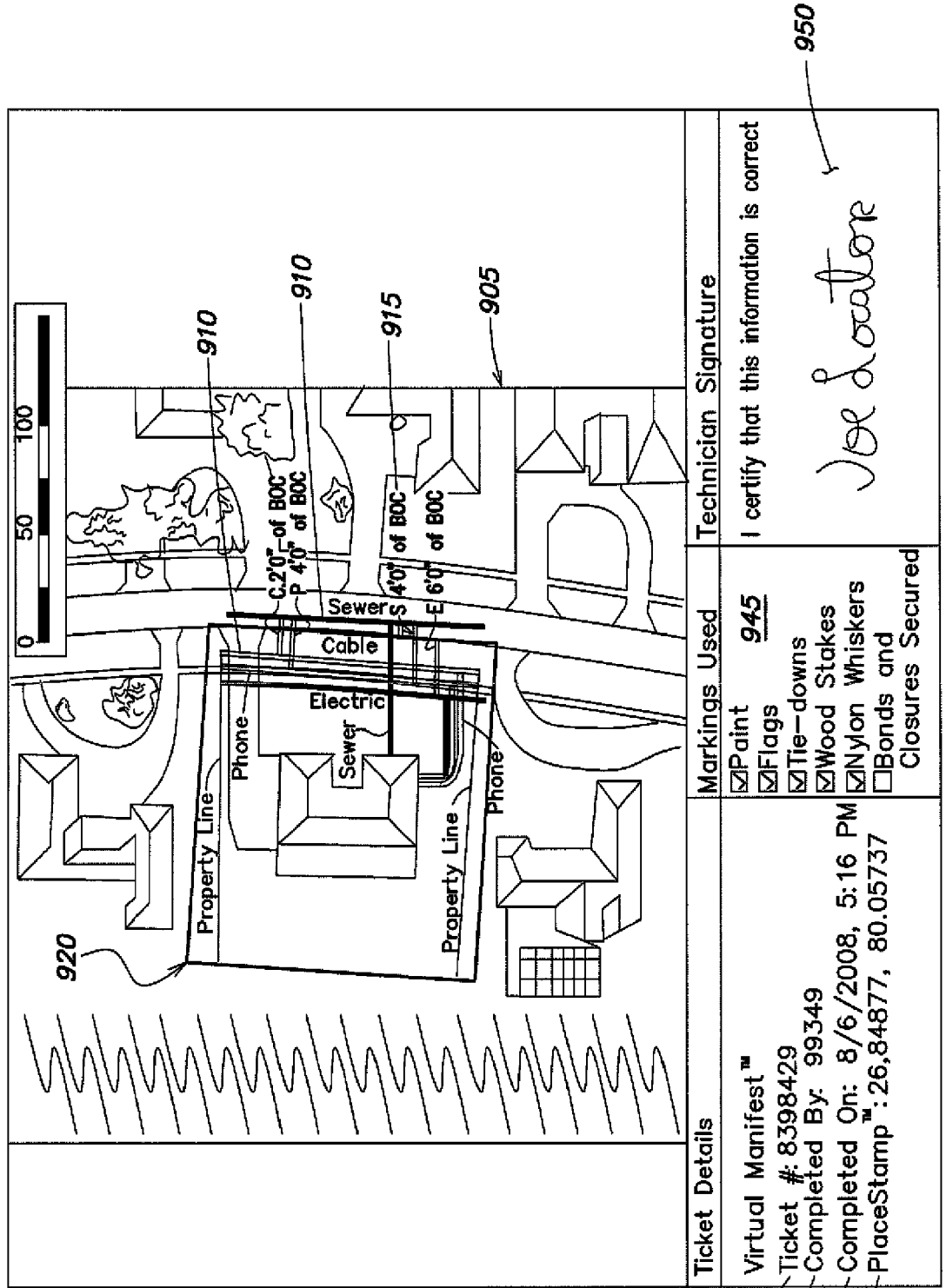
FIG. 9 is a diagram illustrating various elements of a searchable electronic record of a locate operation according to one embodiment of the present invention.

FIG. 9 shows an exemplary searchable electronic record or electronic manifest 900 that may be generated according to methods and apparatus described herein. The electronic manifest comprises image data or information including a marked-up image 905. In the example of FIG. 9, the marked-up image 905 includes digital representations 910 (locate mark indicators) of physical locate marks, offset indicia 915, and virtual white lines 920 (dig area indicators). In addition, the electronic manifest 900 comprises non-image information relating to the locate operation, derived from one or more of the fields of the exemplary data set 700 illustrated in FIG. 7. In the example of FIG. 9, the displayed elements of such a data set constituting non-image information include (but are not limited to) a ticket number 925 for the locate operation (from the ticket number field 790), an identifier 930 of the locate technician (e.g., from the field 765 or another similar field, which may indicate facility owner/operator, or locate company/technician), a time and date stamp 935 indicating when the electronic manifest was created (from the timestamp filed 710), a location stamp 940 indicating where the electronic manifest was created (from the location stamp field 715), a completed checklist 945 of markings used in the locate operation (from the marking method field 770), and a locate technician signature 950 certifying that the information of the electronic manifest is correct (from the certification field 725). The marked-up image and additional information relating to the locate operation may be stored as a single file (e.g., a combined image or image and text file), in associated files, or separately. It should be appreciated that the electronic manifest 900 shown FIG. 9 is merely exemplary, and that an electronic manifest as described herein may alternatively include other combinations of the information described herein and may be formatted in different manners.

An electronic manifest of underground facility locate marks may serve several purposes. For example, the electronic manifest may provide significant improvements in accuracy and save time for the locate technician. Manual sketching is time consuming and imprecise. For example, with manual sketching, the general geographic features of the dig area location, i.e. roads, sidewalks, landscaping, buildings, and other landmarks, must be reproduced by the locate technician. Creation of an electronic manifest that includes drafting on retrieved input images may improve accuracy and eliminate drafting of these general geographic features.

Additionally, or alternatively, an electronic manifest of underground facility locate marks may provide a variety of data formats from a single user event. For example, electronic drafting creates data about the electronic manifest which can be reviewed without viewing the image. The type of marked underground facilities can be determined based upon the existence of different colors, different line types (e.g., solid, dotted or dashed), or other coding schema. Length of marks for each underground facility can be approximated, and the existence and length of offsets detected. If available, the location of the marks can be cross-checked to the user's description or depiction of the area to be marked or excavated.

Additionally, or alternatively, an electronic manifest of underground facility locate marks may provide for easier dissemination and record-keeping. Electronic manifests can be associated with individual tickets and recalled electronically, avoiding the uncertainties and errors associated with manual filing systems. Furthermore, electronic manifests can be interrogated to ensure that the information recorded on the electronic manifest accurately comports with billing data or other information regarding the locate operation(s) performed.

Additionally, or alternatively, information from the electronic manifest regarding the distance between environmental landmarks and located underground facility locate marks may be used to verify subsequent locate operations or the accuracy of the electronic manifest. For example, if the information identifies an underground facility as running parallel to the curb at a distance of three meters, that information may be used to assess the accuracy or consistency of a subsequent locate operation at the same dig area or, upon inspection, the accuracy of the electronic manifest.

Additionally, or alternatively, information from the electronic manifest regarding the number and types of underground facilities may be used to estimate the scope of a subsequent locate operation to be performed at a dig area. For example, a large number of underground facilities may be indicative of an extensive (i.e., time-consuming) locate operation.

Additionally, or alternatively, information from the electronic manifest may be used by a quality control supervisor and/or damage inspector to verify the accuracy of the underground facility locate marks. For example, if the user who performed a locate operation indicated that an underground facility runs parallel to a driveway at a distance of two meters, then the quality control supervisor or damage inspector may use this information to verify whether the marks properly reflected the actual location of the underground facilities present within the dig area. Also information from the electronic manifest may be used to train a user and/or to perform quality control relating to a user's work. The electronic manifest can be modified, e.g., after retrieval from the memory of a central server or the user device itself, to include indication of that the manifest has been reviewed and/or approved (e.g., by quality control supervisor). Such an indication may comprise, for example, the signature of the reviewer.

Since it is possible for a locate technician to create a manifest without ever visiting the dig area, it may be desirable to verify that a locate operation was actually performed in the dig area, as discussed herein. According to one exemplary implementation, this may be accomplished by verifying that location information logged by a user device comports with a location where the locate operation was to be performed (e.g., the dig area) and/or that time information logged by a user device comports with a time frame for performing the locate operation (e.g., within 48 hours of the ticket being issued). The time and/or location information may be generated by the user device and automatically logged to the electronic manifest. Alternatively, the time and/or location information may be generated by the locate and/or marking device, transmitted to the user device, and automatically logged to the electronic manifest. The time information may comprise, for example, a time stamp generated by a clock internal to the user device or the locate and/or marking device. Such a time stamp may comprise a date and/or time indicative of when the locate operation was performed. The location information may comprise, for example, GPS coordinates or GPS-derived data such as a city, state, county, and/or address indicative of where the locate operation was performed. The time and/or location information may be stored and/or transmitted as part of the marked-up image or associated data (e.g., data set 700).

Data or non-image information associated with performing the locate operation and/or creating the electronic manifest, such as time spent performing certain actions or actuations of an input or marking device, can optionally be tracked and stored by the user device. The data can be used, for example, to determine the cost of a locate operation, verify the performance of a locate operation, determine the location of physical locate marks, and/or train the locate technician. Exemplary data that may be stored includes: a start time and/or date of the locate operation; an end time and/or date of the locate operation; a total time for marking each utility (e.g., electric, gas, cable, phone, water, recreational water, and sewer); an activity count (e.g., actuations of a marking device) associated with marking each utility; a total time or activity count for other actions (e.g., marking the property line, tie down, sketching, drawing, selecting, dragging, resizing, or performing an undo, clear or zoom); time and data associated with menu clicks, line clicks, and point clicks; image request information and information identifying the requested image; data associated with drawing lines (e.g., utility type, begin location, end location, width, and characteristic (e.g., dashed or solid)); data associated with drawing points (e.g., utility type, location, width, characteristic (e.g., symbol type)); data associated with text boxes (e.g., location, characteristic (e.g., color), and text); drawing data (e.g., start and end time, ticket number, user name and/or identification, and IP address); and location data (e.g., image centroid, ticket location, start location, and end location).

It should be appreciated that the user device described herein is merely exemplary and that other implementations of user device are possible. For example, the user device and/or certain components thereof may be integrated within a locate and/or marking device. In this case, the user device may share a display with that of the locate and/or marking device and process and store data within the locate and/or marking device.

CONCLUSION

Aspects of the invention as described herein enable retrieving from a database the appropriate input image of a specific geographic location, or dig area, where locate operations are to be conducted for underground facilities. The user may draft, on the retrieved image, a variety of features, including but not limited to (1) the type of underground facilities marked using an appropriate color or other coding schema, (2) the number of underground facilities marked within the dig area, (3) the approximate geographic location of each set of underground facility locate marks, and (4) the appropriate environmental landmark offsets for each set of underground facility locate marks. The combination of the retrieved image and additional information drafted by the user may be saved in a variety of formats as an electronic manifest. Other information regarding the specific geographic location of the locate marks and environmental landmarks may be incorporated into the electronic manifest using direct input from GPS-enabled positioning tools and the like.

The foregoing description is not intended to be exhaustive or to limit the description to the precise form disclosed. Modifications and variations are possible in light of the above disclosure or may be acquired from practice of the invention.

For example, certain information was described as being presented visually on a screen of user device 210. In other implementations) this information may be audibly provided to the user. Also, particular information was described as being input via an input device 340, such as a screen of user device 210. In other implementations, this information may be provided in other ways, such as by receiving inputs via input keys and/or buttons, by recognizing speech of the user, or by monitoring a condition of the user. More particularly, the input device 340 may be capable of capturing signals that reflect a user's intent. For example, the input device 340 may include a microphone that can capture a user's intent by capturing the user's audible commands. Alternatively, the input device 340 may interact with a device that monitors a condition of the user, such as eye movement, brain activity, or heart rate.

As another example, certain components, such as user device 210 and central server 220 were described as using an image cache. In other implementations, user device 210 and/or central server 220 may communicate with an image server (such as imager server 230) in real-time, so that no image cache may be required. In still other implementations, the user device 210 may, for example, communicate in real time with the central server 220.

As another example, it should be noted that reference to a GPS-enabled device is not limited to GPS systems only, and that any global navigation satellite system or other system that provides geo-spatial positioning may be used in implementations of the invention.

Also, while a series of blocks has been described with regard to FIG. 6, the order of the blocks may be modified in other implementations. Further, non-dependent blocks may be performed in parallel.

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for generating a searchable electronic record of a locate operation performed by a locate technician in a dig area, wherein at least a portion of the dig area is planned to be excavated or disturbed during excavation activities, the method comprising:

A) electronically receiving source data representing at least one input image of a geographic area comprising the dig area;

B) processing the source data so as to display at least a portion of the at least one input image on a display device;

C) adding to the displayed at least one input image at least one digital representation of at least one physical locate mark so as to generate a marked-up image including the at least one digital representation of the at least one physical locate mark, the at least one physical locate mark applied to ground in the dig area by the locate technician during a locate operation comprising identifying, using the at least one physical locate mark, a presence or an absence of at least one underground facility within the dig area; and D) electronically transmitting and/or electronically storing information relating to the marked-up image so as to generate the searchable electronic record of the locate operation.

2. The method of claim 1, wherein C) comprises:
adding, via a user input device associated with the display device, the at least one digital representation of the at least one physical locate mark to the displayed at least one input image, so as to generate the marked-up image.

3. The method of claim 1, wherein C) comprises:
C1) electronically receiving location information regarding a location of the at least one physical locate mark; and
C2) based at least in part on the location information received in C1), adding to the displayed at least one input image the at least one digital representation of the at least one physical locate mark.

4. The method of claim 3, wherein the location information received in C1) includes geographic coordinates provided by a GPS-enabled device.

5. The method of claim 1, wherein the at least one input image comprises at least one dig area indicator to provide at least one indication of the dig area in the displayed at least one input image.

6. The method of claim 1, wherein the at least one input image comprises a scanned or converted manual free-hand sketch of the geographic area.

7. The method of claim 1, wherein the at least one input image comprises at least one map of the geographic area.

8. The method of claim 7, wherein the at least one map of the geographic area includes one or more of: a street/road map, a topographical map, a military map, a parcel map, a tax map, a town or county planning map, a polygon map, and a virtual map.

9. The method of claim 8, wherein the source data representing the at least one map includes geo-encoded information.

10. The method of claim 7, wherein the at least one map includes at least one facility map illustrating at least one installed underground facility in the geographic area.

11. The method of claim 10, wherein the source data representing the at least one facility map includes geo-encoded information.

12. The method of claim 1, wherein the at least one input image comprises at least one architectural, construction and/or engineering drawing or virtual rendition of the geographic area.

13. The method of claim 1, wherein the at least one input image comprises at least one land survey relating to the geographic area.

14. The method of claim 1, wherein the at least one input image comprises at least one grid to provide representational geographic information and a reference relating to the geographic area.

15. The method of claim 1, wherein the source data comprises geo-encoded information relating to the geographical area.

16. The method of claim 1, wherein the source data does not include pixel information from a digital image acquisition device.

17. The method of claim 1, wherein the at least one input image comprises at least one photographic image.

18. The method of claim 17, wherein the at least one photographic image comprises at least one street level photographic image.

19. The method of claim 17, wherein the at least one photographic image comprises one or more of a topographical image, a satellite image, and an aerial image.

20. At least one computer-readable medium encoded with instructions that, when executed on at least one processing unit, perform a method for generating a searchable electronic record of a locate operation performed by a locate technician in a dig area, wherein at least a portion of the dig area is planned to be excavated or disturbed during excavation activities, the method comprising:
A) electronically receiving source data representing at least one input image of a geographic area comprising the dig area;
B) processing the source data so as to display at least a portion of the at least one input image on a display device;
C) adding to the displayed at least one input image at least one digital representation of at least one physical locate mark so as to generate a marked-up image including the at least one digital representation of the at least one physical locate mark, the at least one physical locate mark applied to ground in the dig area by the locate technician during a locate operation comprising identifying, using the at least one physical locate mark, a presence or an absence of at least one underground facility within the dig area; and
D) electronically transmitting and/or electronically storing information relating to the marked-up image so as to generate the searchable electronic record of the locate operation.

21. An apparatus for facilitating generation of a searchable electronic record of a locate operation performed by a locate technician in a dig area, wherein at least a portion of the dig area is planned to be excavated or disturbed during excavation activities, the apparatus comprising:
a communication interface;
a display device;
a memory to store processor-executable instructions; and
a processing unit coupled to the communication interface, the display device, and the memory, wherein upon execution of the processor-executable instructions by the processing unit, the processing unit:
controls the communication interface to electronically receive source data representing at least one input image of a geographic area including the dig area;
processes the source data and controls the display device so as to display at least a portion of the at least one input image;
adds to the displayed at least one input image at least one digital representation of at least one physical locate mark so as to generate a marked-up image including the at least one digital representation of the at least one physical locate mark, the at least one physical locate mark applied to ground in the dig area by the locate technician during a locate operation comprising identifying, using the at least one physical locate mark, a presence or an absence of at least one underground facility within the dig area; and
further controls the communication interface and/or the memory to electronically transmit and/or electronically store information relating to the marked-up image so as to generate the searchable electronic record of the locate operation.

22. The apparatus of claim 21, further comprising a user input device, wherein upon execution of the processor-executable instructions by the processing unit, the processing unit:

acquires user input from the user input device, the user input relating to a geographic location of the at least one physical locate mark applied by the locate technician during the locate operation; and adds to the displayed at least one input image the at least one digital representation of the at least one physical locate mark based at least in part on the user input.

23. The apparatus of claim 22, wherein the user input device comprises at least one of a stylus and a mouse.

24. The apparatus of claim 21, wherein upon execution of the processor-executable instructions by the processing unit, the processing unit:

acquires input from a marking device configured to apply the at least one physical locate mark to the dig area, the input relating to a geographic location of the at least one physical locate mark applied by the locate technician during the locate operation; and adds to the displayed at least one input image the at least one digital representation of the at least one physical locate mark, based at least in part on the input acquired from the marking device.

25. The apparatus of claim 24, in combination with the marking device, wherein the marking device comprises a GPS-enabled device.

26. The combination of claim 25, wherein the GPS-enabled device is a GPS-enabled paint wand.

27. The combination of claim 25, wherein the GPS-enabled device is a combined locating/marking device configured to both identify an underground facility in the dig area and apply the at least one physical locate mark to the dig area.

28. The apparatus of claim 21, wherein the at least one input image comprises at least one dig area indicator to provide at least one indication of the dig area in the displayed at least one input image.

29. The apparatus of claim 21, wherein the at least one input image comprises a scanned or converted manual freehand sketch of the geographic area.

30. The apparatus of claim 21, wherein the at least one input image comprises at least one map of the geographic area.

31. The apparatus of claim 30, wherein the at least one map of the geographic area includes one or more of: a street/road map, a topographical map, a military map, a parcel map, a tax map, a town or county planning map, a polygon map, and a virtual map.

32. The apparatus of claim 31, wherein the source data representing the at least one map includes geo-encoded information.

33. The apparatus of claim 30, wherein the at least one map includes at least one facility map illustrating at least one installed underground facility in the geographic area.

34. The apparatus of claim 33, wherein the source data representing the at least one facility map includes geo-encoded information.

35. The apparatus of claim 21, wherein the at least one input image comprises at least one architectural, construction and/or engineering drawing or virtual rendition of the geographic area.

36. The apparatus of claim 21, wherein the at least one input image comprises at least one land survey relating to the geographic area.

37. The apparatus of claim 21, wherein the at least one input image comprises at least one grid to provide representational geographic information and a reference relating to the geographic area.

38. The apparatus of claim 21, wherein the source data comprises geo-encoded information relating to the geographical area.

39. The apparatus of claim 21, wherein the source data does not include pixel information from a digital image acquisition device.

40. The apparatus of claim 21, wherein the at least one input image comprises at least one photographic image.

41. The apparatus of claim 40, wherein the at least one photographic image comprises at least one street level photographic image.

42. The apparatus of claim 40, wherein the at least one photographic image comprises one or more of a topographical image, a satellite image, and an aerial image.

* * * * *